US008927038B2

(12) United States Patent
Broekaert et al.

(10) Patent No.: US 8,927,038 B2
(45) Date of Patent: Jan. 6, 2015

(54) (ARABINO)XYLAN OLIGOSACCHARIDE PREPARATION

(75) Inventors: Willem Broekaert, Dilbeek (BE); Christophe Courtin, Wilsele (BE); Jan Delcour, Heverlee (BE)

(73) Assignee: Cargill, Incorporated, Wayzata, MN (US)

( * ) Notice: Subject to any disclaimer, the term of this patent is extended or adjusted under 35 U.S.C. 154(b) by 209 days.

(21) Appl. No.: 12/934,224

(22) PCT Filed: Mar. 25, 2009

(86) PCT No.: PCT/BE2009/000020
§ 371 (c)(1),
(2), (4) Date: Sep. 23, 2010

(87) PCT Pub. No.: WO2009/117790
PCT Pub. Date: Oct. 1, 2009

(65) Prior Publication Data
US 2011/0020498 A1  Jan. 27, 2011

(30) Foreign Application Priority Data
Mar. 25, 2008 (GB) .................... 0805360.5

(51) Int. Cl.
| A23G 3/00 | (2006.01) |
| A23K 1/18 | (2006.01) |
| A23L 2/52 | (2006.01) |
| A21D 2/18 | (2006.01) |
| A23L 1/30 | (2006.01) |
| A23K 1/16 | (2006.01) |

(52) U.S. Cl.
CPC ............ *A23L 1/3002* (2013.01); *A23K 1/1846* (2013.01); *A23L 2/52* (2013.01); *A21D 2/18* (2013.01); *A21D 2/183* (2013.01); *A23K 1/1643* (2013.01); *A23V 2002/00* (2013.01)
USPC .............................. 426/271; 426/18; 426/436

(58) Field of Classification Search
USPC ........................................................ 426/271
See application file for complete search history.

(56) References Cited

U.S. PATENT DOCUMENTS

| 4,494,530 | A | 1/1985 | Jansma et al. |
| 5,362,502 | A | 11/1994 | Slade et al. |

(Continued)

FOREIGN PATENT DOCUMENTS

| EP | 0 856 259 A1 | 8/1998 |
| EP | 0 904 784 A1 | 3/1999 |

(Continued)

OTHER PUBLICATIONS

Obel: Dynamic changes in cell wall polysaccharides during wheat seedling development; Phytochemistry: vol. 60, Issue 6, Jul. 2002, pp. 603-610.*

(Continued)

*Primary Examiner* — Patricia George
(74) *Attorney, Agent, or Firm* — Clark & Elbing LLP

(57) ABSTRACT

The present invention relates to preparations comprising (arabino)xylan oligosaccharides with average degree of polymerisation between 4 and 10 and average degree of arabinose substitution between 0.15 and 0.35, which beneficially modulate the intestinal flora, such preparation comprising both xylo- and arabinoxylo-oligosaccharides. Preferably, the arabinoxylooligosaccharides are substituted in part by hydroxycinnamic acids and exert antioxidant effects. Furthermore, it is preferred that the preparations according to the present invention have a nitrogen content below 0.16% (w/w) in order to ensure good organoleptic and color properties, particularly upon heating said preparations. In addition, food, beverage and nutritional supplement products comprising the preparations are provided as well as methods to prepare the said preparations.

25 Claims, 5 Drawing Sheets

No ion exchange treatment

Ion exchange treatment

AXOS preparation 11

AXOS preparation 17

AXOS preparation 18

AXOS preparation 15

AXOS preparation 16

(56) References Cited

U.S. PATENT DOCUMENTS

Figure 1:
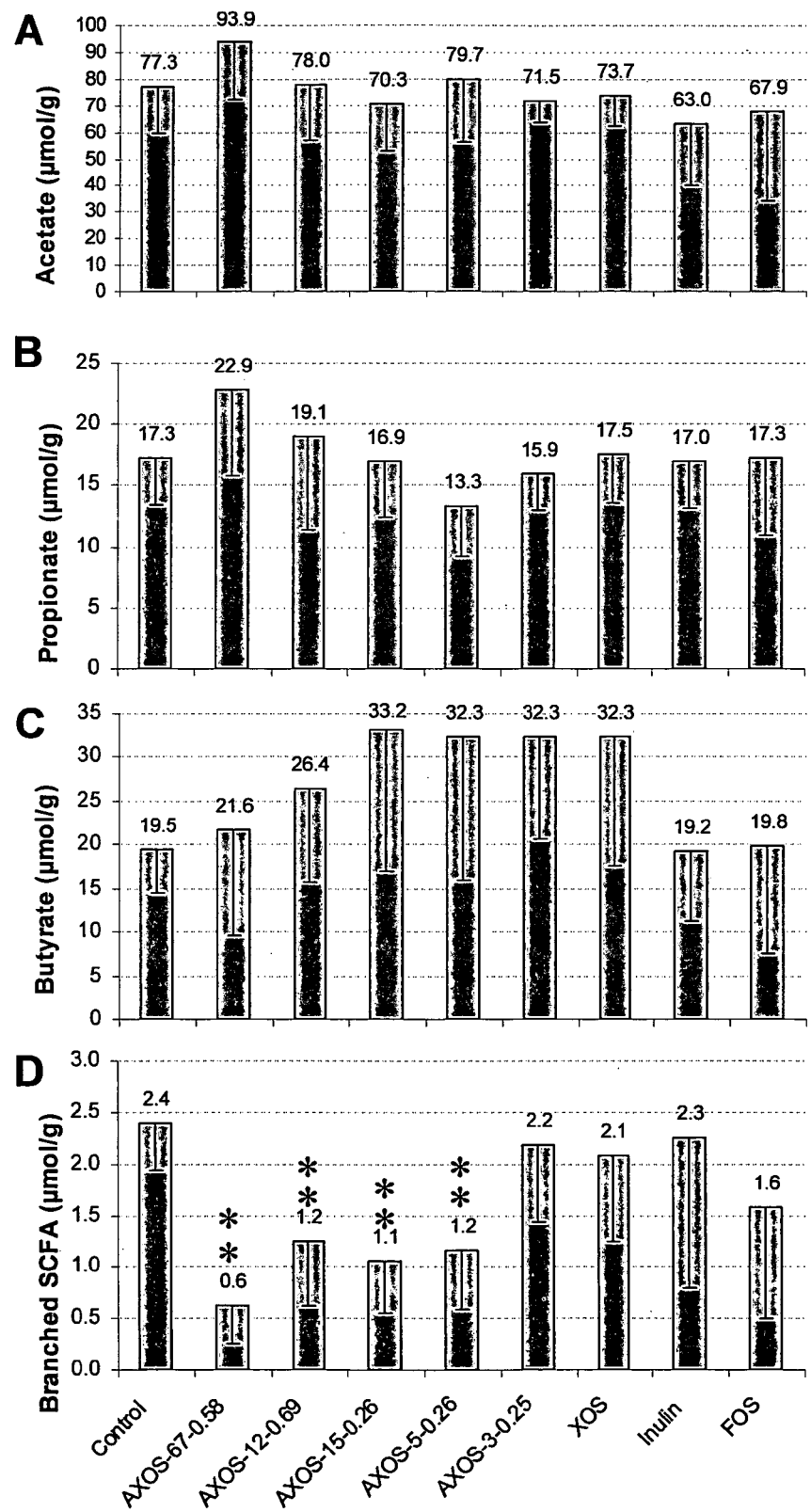

| | | | |
|---|---|---|---|
| 5,429,828 | A | 7/1995 | Fodge et al. |
| 5,614,501 | A | 3/1997 | Richards |
| 5,622,738 | A | 4/1997 | Takeuchi et al. |
| 6,033,712 | A | 3/2000 | Greenshields et al. |
| 6,132,716 | A | 10/2000 | Morgan et al. |
| 6,147,206 | A | 11/2000 | Doner et al. |
| 6,162,473 | A | 12/2000 | Fodge et al. |
| 6,558,930 | B2 | 5/2003 | Hwang et al. |
| 6,720,014 | B1 | 4/2004 | Short et al. |
| 7,033,633 | B2 | 4/2006 | Poulsen et al. |
| 2001/0020091 | A1 | 9/2001 | Buchanan et al. |
| 2002/0195213 | A1 | 12/2002 | Izumi et al. |
| 2008/0031814 | A1* | 2/2008 | Hageman ............... 424/9.1 |
| 2008/0102162 | A1 | 5/2008 | Delcour et al. |
| 2010/0035302 | A1 | 2/2010 | Broekaert et al. |
| 2011/0020498 | A1 | 1/2011 | Broekaert et al. |

FOREIGN PATENT DOCUMENTS

| | | | |
|---|---|---|---|
| EP | 1 175 905 A1 | | 1/2002 |
| EP | 0 463 706 B1 | | 3/2003 |
| EP | 1 137 424 B1 | | 4/2004 |
| EP | 1 418 819 B1 | | 11/2005 |
| FR | 2 811 997 | | 1/2002 |
| JP | 02-001701 | | 1/1990 |
| JP | 2303459 | | 12/1990 |
| JP | H-02-303459 A | | 12/1990 |
| JP | 021162789 | * | 2/1992 ............... 435/101 |
| JP | 4309501 A | | 11/1992 |
| JP | 5112455 A | | 5/1993 |
| JP | 06-217761 | | 8/1994 |
| JP | 10120704 A | | 5/1998 |
| JP | 10237107 A | | 9/1998 |
| JP | 2000-501935 | | 2/2000 |
| JP | 2004-520058 A | | 7/2004 |
| JP | 2005-500807 | | 1/2005 |
| JP | 2008-504038 A | | 2/2008 |
| WO | WO 91/04673 | | 4/1991 |
| WO | WO 95/23514 | | 9/1995 |
| WO | WO 96/06935 | | 3/1996 |
| WO | WO 97/09423 | | 3/1997 |
| WO | WO 97/20920 | | 6/1997 |
| WO | WO 97/27293 A1 | | 7/1997 |
| WO | WO 98/54305 | | 12/1998 |
| WO | WO 99/30570 A1 | | 6/1999 |
| WO | WO 01/33973 A2 | | 5/2001 |
| WO | WO 01/42433 A2 | | 6/2001 |
| WO | WO 01/67891 A1 | | 9/2001 |
| WO | WO 01/89317 A2 | | 11/2001 |
| WO | WO 02/24926 A1 | | 3/2002 |
| WO | WO 02/051264 A2 | | 7/2002 |
| WO | WO 02/067698 A1 | | 9/2002 |
| WO | WO-02/067698 A1 | | 9/2002 |
| WO | WO-2006/002495 A1 | | 1/2006 |
| WO | WO 2006/002495 A1 | | 1/2006 |
| WO | WO 2006/027529 A2 | | 3/2006 |
| WO | WO 2008/000050 A2 | | 1/2008 |
| WO | WO 2008/098320 | | 8/2008 |
| WO | WO 2009/117790 A2 | | 10/2009 |

OTHER PUBLICATIONS

Faulds: Arabinoxylan and mono- and dimeric ferulic acid release from brewer's grain and wheat bran by feruloyl esterases and glycosyl hydrolases from Humicola insolens; Received: Sep. 3, 2003 / Revised: Nov. 20, 2003 / Accepted: Nov. 21, 2003 / Published online: Jan. 17, 2004 # Springer-Verlag 2004.*
Oscarsson: Chemical Composition of Barley Samples Focusing on Dietary Fibre Components; Journal of Cereal Science 24 (1996) 161-170.*
ACP (Agriculture and Consumer Protection): FAO: Food energy—methods of analysis and conversion factors . . . ; Report of a technical workshop, Rome, Dec. 3-6, 2002.*
Cloetens et al., "The Bifidogenic Potential of Arabinoxylo-Oligosaccharides in Healthy Volunteers Depends on the Degree of Polymerisation," Abstract W1382, *Gastro.* 134(4):A-692 (2008).
Cloetens et al., "The Effect of Two Different Doses of Arabinoxylo-Oligosaccharides and Oligofructose Enriched Inulin on the Colonic Ammonia Metabolism in Healthy Volunteers," Abstract 1383, *Gastro.* 134(4): A-693 (2008).
International Preliminary Report on Patentability for International Application No. PCT/BE2009/000020 dated Mar. 18, 2010 (date of completion and mailing of report).
International Search Report for PCT International Application No. PCT/BE2009/000020 dated Sep. 23, 2009 (date of completion of search) and Oct. 13, 2009 (date of mailing of report).
Swennen et al., "Large-Scale Production and Characterisation of Wheat Bran Arabinoxylooligosaccharides," *J. Science and Food Agric.* 86(11):1722-1731 (2006).
Written Opinion of the International Searching Authority of PCT International Application No. PCT/BE2009/000020 dated Sep. 23, 2009 (date of completion of this opinion) and Oct. 13, 2009 (date of mailing of this opinion).
Yamada et al., "Structure and Properties of Oligosaccharides from Wheat Bran," *Cereal Foods World* 38(4):490-492 (1993).
Reply to Written Opinion for International Patent Application No. PCT/BE2009/000020 dated Jan. 29, 2010.
Cloetens et al.,"The Effect of Two Different Doses of Arabinoxylo-Oligosaccharides and Oligofructose Enriched Inulin on the Colonic Ammonia Metabolism in Healthy Volunteers," Abstract W1383, *Gastro.* 134(4): A-693 (2008).
Swennen et al., "Ultrafiltration and Ethanol Precipitation for Isolation of Arabinoxylooligosaccharides with Different Structures," *Carbohydrate Polymers* 62:283-292 (2005).
Office Action for Chinese Patent Application No. 200980116562.X, dated Oct. 20, 2011 (with Translation).
*Association des Amidonneries de Céréales de l'Union Européenne*, printout from http://www.authorstream.com/Presentation/miloung-16703-7-Labelling-wheat-starch-derivatives-AAC-members-Why-new-EU-rules-specific-forwheat-seedcount-presentation-002-News-Reports-ppt-powerpoint/, "Changes in the EU Labeling Legislation," (Nov. 19, 2003).
Beaugrand et al., "Impact and Efficiency of GH10 and GH11 Thermostable Endoxylanases on Wheat Bran and Alkali-Extactable Arabinoxylans," *Carbohydrate Research* 339:2529-2540 (2004).
Clayton, "The Extraction and Ion-Exchange Chromatography of Buffer-Soluble and Gluten Proteins of Wheat Flour," *Cereal Chemistry* 43:495-516 (1966).
Fang et al., "Influence of Temperature on the Retention Behaviour of Proteins in Cation-Exchange Chromatography," *Journal of Chromatography A* 729(1-2):49-66 (1996), Abstract only.
Katapodis amd Christakopoulos,"Enzymic Production of Feruloyl Xylo-Oligosaccharides from Corn Cobs by a Family 10 Xylanase from *Thermoascus aurantiacus,*" *LWT* 41:1239-1243 (2008), e-published Sep. 1, 2007.
Official Communication from the European Patent Office for European Patent Application No. 09725460.1, dated Feb. 15, 2011.
Official Communication from the European Patent Office for European Patent Application No. 09725460.1, dated Feb. 21, 2011.
Official Communication from the European Patent Office for European Patent Application No. 09725460.1, dated Feb. 28, 2011.
Purolite Company, "Corn Sweetener Refining with Ion Exchange Resins," (2007).
Roberfroid and Slavin , "Nondigestible Oligosaccharides," *Critical Reviews in Food Science and Nutrition* 40(6):461-480 (2000).
Swennen, "Production, Characterisation, and Functionality of Arabinoxyooligosaccharides with Different Structures," *Dissertationes de Agricultura, Katholieke Universiteit Leuven* (Feb. 2007).
Yuan et al., "Antioxidant Activity of Feruloylated Oligosaccharides from Wheat Bran," *Food Chemistry* 90:759-764 (2005).
Office Action for Mexican Patent Application No. MX/a/2010/010450, dated Jul. 9, 2013 (2 pages).
Partial Translation of Office Action for Mexican Patent Application No. MX/a/2010/010450, dated Jul. 9, 2013 (1 page).

(56) References Cited

OTHER PUBLICATIONS

Patent Examination Report No. 1 for Australian Patent Application No. 2009228003, issued Aug. 30, 2013 (3 pages).
Notification of Reasons for Refusal for Japanese Patent Application No. 2011-501065, mailed Febuary 12, 2014 (English language translation provided).
Swennen et al., "Large-scale production and characterisation of wheat bran arabinoxylooligosaccharides," J. Sci. Food Agric. 86:1722-1731 (2006).
Swennen et al., "Ultrafiltration and ethanol precipitation for isolation of arabinoxylooligosaccharides with different structures," Carbohydr. Polym. 62:283-292 (2005).
Abe et al., "Effect of Administration of Bifidobacteria and Lactic Acid Bacteria to Newborn Calves and Piglets," J. Dairy Sci. 78:2838-2846 (1995).
Advisory Action for U.S. Appl. No. 10/487,184, dated Nov. 15, 2007.
Advisory Action for U.S. Appl. No. 10/487,184, dated Apr. 20, 2010.
Annison et al., "Analysis of Wheat Arabinoxylans from a Large-Scale Isolation," Carbohydrate Polymers 19: 151-159 (1992).
Aust et al., "Estimation of Available Energy of Dietary Fibres by Indirect Calorimetry in Rats," Eur. J. Nutr. 40:23-29 (2001).
Bach Knudsen and Hansen, "Gastrointestinal Implications in Pigs of Wheat and Oat Fractions, 1. Digestibility and Bulking Properties of Polysaccharides and other Major Constituents" Br. J. Nutr. 65(2):217-232 (1991).
Bedford, M.R., "Factors Influencing the Use of Enzymes in Cereal-Based Diets," in Recent Advances in Enzymes in Grain Processing, 19:1-9 (2002).
Bedford and Classen, "Reduction of Intestinal Viscosity through Manipulation of Dietary Rye and Pentosanase Concentration Is Effected Through Changes in the Carbohydrate Composition of the Intestinal Aqueous Phase and Results in Improved Growth Rate and Food Conversion Efficiency of Broiler Chicks," J. Nutr. 122:560-569 (1992).
Bird, "Performance Improvements Following Enzyme Supplementation of Wheat- and Barley-Based Poultry Diets," in Enzymes in Poultry Swine Nutr. Proceedings of the First Chinese Symposium on Food Enzymes, Nanjing Agricultural University, Nanjing, P.R. China, May 6-8, 1996. pp. 73-87. Published Jun. 1997.
Bonneau and Laarveld, "Biotechnology in Animal Nutrition, Physiology and Health," Livest. Prod. Sci. 59:223-241 (1999).
Boros and Marquardt, "Improvement of Nutritional Value of Rye by Enzyme Application", Hodowla Roslin Aklimatyzacja I Nasiennictwo, 38:95-110 (1994).
Brennan and Singh, Economic Assessment of Improving Nutritional Characteristics of Feed Grains, Report prepared for Grains Research and Development Corporation, Economic Research Report No. 3, Wagga Wagga (2000).
Brief filed on behalf of DF3 SAS and Cosucra Groupe Warcoing in opposition of EP 1 758 470, dated Feb. 17, 2011, including Annex 1 and Annex 2.
Burton-Freeman, "Dietary Fiber and Energy Regulation," J. Nutr. 130(2S Suppl.): 272S-275S (2000).
Caprita et al., "Biochemical Aspects of Non-Starch Polysaccharides," Scientific Papers: Animal Science and Biotechnologies 43:368-375 (2010).
Carvalheiro et al., "Optimization of Brewery's Spent Grain Dilute-Acid Hydrolysis for the Production of Pentose-Rich Culture Media," Appl. Biochem. Biotechnol. 113-116:1059-1072 (2004). (Abstract only).
"Cereal Grains and Their By-Products," www.asasea.com abstract, printed Mar. 20, 2003.
Choct, M., "Feed Non-Starch Polysaccharides: Chemical Structures and Significance", ASA Southeast Asia, p. 1-9, Choct, M. (1997). Feed Milling International, June Issue pp. 13-26.
Choct and Annison, "Anti-Nutritive Effect of Wheat Pentosans in Broiler Chickens: Roles of Viscosity and Gut Microflora," Br. Poult. Sci. 33:821-834 (1992).
Choct and Kocher, "Non-Starch Carbohydrates: Digestion and its Secondary Effects in Monogastrics," Proc. Nutr. Soc. Aust. 24:31-38 (2000).
Cloetens, "In Vivo Evaluation of the Gastrointestinal Effects of Arabinoxylan-Oligosaccharides in Healthy Subjects," Doctoral Thesis in Medical Sciences, Katholieke Universiteit Leuven (Apr. 2009).
Close, "Producing Pigs Without Antibiotic Growth Promoters," Advances in Pork Production 11:47-56 (2000).
Communication from Examiner for GB Application No. 0612976.1, dated Nov. 1, 2006.
Cosucra, "Quantités d'oligosaccharides prébiotiques vendus par la société," dated Jul. 3, 2009; cited in opposition of European Patent Application No. EP 02766984.5 on Aug. 17, 2009.
Courtin et al., "Determination of Reducing End Sugar Residues in Oligo- and Polysaccharides by Gas—Liquid Chromatography", Journal of Chromatography A, 866:97-104 (2000).
Courtin et al., "Dietary Inclusion of Wheat Bran Arabinoxylooligosaccharides Induces Beneficial Nutritional Effects of Chickens," Cereal Chem. 85(5):607-613 (2008).
Courtin and Delcour, "Physicochemical and Bread-Making Properties of Low Molecular Weight Wheat-Derived Arabinoxylans," J. Agric. Food Chem. 46:4066-4073 (1998).
Crittenden et al., "In Vitro Fermentation of Cereal Dietary Fibre Carbohydrates by Probiotic and Intestinal Bacteria," J. Sci. Food Agric. 82:781-789 (2002).
"Cuisson-Extrusion De Nombreuses Applications," Cap Sur Les Nouvelles Technologies, Magazine IAA 1040: 24 and 28 (1986).
Data Sheet of Cellulase <Onozuka> RS from Trichoderma viride, Copyright 2007/SERVA GmbH.
Data Sheet of Pentopan® Mona BG, Novozymes A/S Denmark (2008).
De Preter et al., "The In Vivo Use of the Stable Isotope-Labelled Biomarkers Lactor-[$^{15}$N]ureide and [$^{2}$H$_4$]Tyrosine to Assess the Effects of Pro- and Prebiotics on the Intestinal Flora of Healthy Human Volunteers," British Journal of Nutrition 92:439-446 (2004).
Egi et al., "Arabinoxylans and Their Behavior During Malting and Brewing," MBAA TQ 41(3):248-267 (2004).
E-mail Communication between Joël Bazin of Novozymes France S.A. and Joseph Fockedey of Cosucra Groupe Warcoing and its English translation, dated Sep. 1, 2010 and Sep. 6, 2010.
English Language Translation of the Office Action issued in connection with Chinese Patent Application No. 200580022193, dated Feb. 12, 2010.
Fastinger, "Development of a Novel Value-Added Distillers Dried Grains with Solubles: Effects on Amino Acid and Energy Digestibility in Pigs," Dissertation, Ohio State University (2005).
Faulds et al., "Specificity of Feruloyl Esterases for Water-Extractable and Water-Unextractable Feruloylated Polysaccharides: Influence of Xylanase," Journal of Cereal Science 38:281-288 (2003).
Glitsø et al., "Degradation of Rye Arabinoxylans in the Large Intestines of Pigs," J. Sci. Food Agric. 79:961-969 (1999).
Grootaert et al., "Microbial Metabolism and Prebiotic Potency of Arabinoxylan Oligosaccharides in the Human Intestine," Trends in Food Science & Technology 18:64-71 (2007).
Groot Wassink et al., "Fractionation of Crude Pentosanase (Arabinoxylanase) for Improvement of the Nutritional Value of Rye Diets for Broiler Chickens," J. Sci. Food Agric. 46(3): 289-300 (1989).
Hoffmann et al., "$^1$H-N.M.R. Study of Enzymically Generated Wheat-Endosperm Arabinoxylan Oligosaccharides: Structures of Hepta-to Tetradeca-Saccharides Containing Two or Three branched Xylose Residues," Carbohydr. Res. 223: 19-44 (1992).
Hoffmann et al., "Structural Characteristics of the Warm-Water-Soluble Arabinoxylans from the Tailings of the Soft Wheat Variety Kadet," Carbohydrate Polymers 16:275-289 (1991).
Instruction Manual for Cellulase "Onozuka" R-10 from Trichoderma viride cited in brief filed on behalf of DF3 SAS and Cosucra Groupe Warcoing in opposition of EP 1 758 470, dated Feb. 17, 2011.
International Preliminary Report on Patentability for PCT/BE2007/000072, issued Jan. 6, 2009, mailed Jan. 15, 2009.
International Search Report and Written Opinion for PCT/BE2007/000072, mailed Jan. 29, 2008.

(56) References Cited

OTHER PUBLICATIONS

Interview Summary for U.S. Appl. No. 10/487,184, dated Dec. 10, 2008.
Kitta (Shigeki Kitta, Executive General Manager, Consumer Health Products Division, Suntory Limited Dojimahama 2-1-40, Kita-ku, Osaka, Osaka 530-8203, Japan). "Beginning of Sales," [Letter]. Letter to: Joseph Fockedey (Cosucra, Rue de la Sucrerie, 1, 7740 Warcoing, Belgium). Sep. 5, 2007.
Kontula et al., "Oat Bran β-gluco- and Xylo-Oligosaccharides as Fermentative Substrates for Lactic Acid Bacteria," *Int. J. Food Microbiol.* 45: 163-169 (1998).
Kurmann and Rasic, Chapter 6, "The Health Potential of Products Containing Bifidobacteria," in *Therapeutic Properties of Fermented Milks*, Robinson ed., pp. 117-157 (1991).
Livesey, "The Energy Values of Dietary Fibre and Sugar Alcohols for Man," *Nutr. Res. Rev.* 5(1):61-84 (1992).
Maes et al., "Relative Activity of Two Endoxylanases Towards Water-Unextractable Arabinoxylans in Wheat Bran," *Journal of Cereal Science* 39:181-186 (2004).
Maes, "Structural Features of Wheat (*Triticum aestivum*) Bran Arabinoxylan Fractions Extracted with Endoxylanases or Alkaline Media," *Doctoral Dissertation in Agriculture, Katholieke Universiteit Leuven*, Belgium (Aug. 2004).
Majerowicz, (Bredema, 38 Avenue de l'Opéra 75002 Paris, France, mm@bredema.com); Joseph Fockedey (Cosucra, Rue de la Sucrerie, 1, 7740 Warcoing, Belgium, Jfockedey@cosucra.com ). "Opposition au Brevet EP 1 418 819 B1," [electronic mail on the Internet]. Message to: Stephanie Patarin (Bredema, 38 Avenue de l'Opéra 75002 Paris, France; stp@bredema.com) and Eric Enderlin (Bredema, 38 Avenue de l'Opéra 75002 Paris, France; een@bredema.com), Marc Majerowicz, (Bredema, 38 Avenue de l'Opéra 75002 Paris, France; mm@bredema.com), Yann Dugenet (yann.dugenet@wanadoo.com), Mingan Choct (Professor (seconded to Poultry CRC), Faculty of Arts and Sciences, School of Environmental and Rural Sciences, University of New England, Armidale NSW 2351 Australia, mchoct@une.edu.au), Joseph Fockedey (Cosucra, Rue de la Sucrerie, 1, 7740 Warcoing, Belgium; Jfockedey@cosucra.com ). Sep. 10, 2007, 9:45 AM. French and English languages. The product is a food additive containing about 70 of arabinoxylans, having a molecular mass between 5000 and 758000, and is obtained in the starch industry by wet milling.
Modler, "Bifidogenic Factors—Sources, Metabolism and Applications," *Int. Dairy J.* pp. 383-389 and 391-407 (1994).
Moers et al., "Endoxylanase Substrate Selectivity Determines Degradation of Wheat Water-Extractable and Water-Unextractable Arabinoxylan," *Carbohydrate Research* 340:1319-1327 (2005).
Mroz et al., "Effects of Dietary Carbohydrates and Buffering Capacity on Nutrient Digestibility and Manure Characteristics in Finishing Pigs," *J. Anim. Sci.* 78(12):3096-3106 (2000).
Mul and Perry, "The Role of Fructo-Oligosaccharides in Animal Nutrition," in *Recent Advances in Animal Nutrition, Proceedings of the 28th University of Nottingham Feed Conference*, Cole ed., Nottingham University Press, pp. 57-79 (1994).
Notice of Allowance and Notice of Allowability for U.S. Appl. No. 12/306,943, dated Jul. 14, 2011.
Office Action for Australian Patent Application No. 2005259856, dated Mar. 11, 2010.
Office Action for Canadian Application No. 2,456,304, dated Dec. 18, 2009.
Office Action for Indian Application No. 417/DELNP/2004, dated Feb. 4, 2010.
Office Action for European Patent Application No. EP 07 784 889.3, dated Jun. 24, 2009.
Official Communication from European Patent Office for European Patent Application 07 784 889.3, dated Dec. 9, 2010.
Official Communication from the European Patent Office for European Patent Application 05758958.2, dated Dec. 28, 2010.
Office Action for U.S. Appl. No. 10/487,184, dated Jan. 4, 2007.
Office Action for U.S. Appl. No. 10/487,184, dated Jun. 14, 2007.
Office Action for U.S. Appl. No. 10/487,184, dated Sep. 17, 2008.
Office Action for U.S. Appl. No. 10/487,184, dated Jun. 17, 2009.
Office Action for U.S. Appl. No. 10/487,184, dated Jan. 5, 2010.
Office Action for U.S. Appl. No. 10/487,184, dated Mar. 10, 2011.
Office Action for U.S. Appl. No. 10/487,184, dated Aug. 18, 2011.
Pawlik et al., "Improvement of the Nutritional Value of Rye by the Partial Hydrolysis of the Viscous Water-Soluble Pentosans Following Water-Soaking or Fungal Enzyme Treatment," *Br. Poult. Sci.* 31(3):525-538 (1990).
Piccioni, "Dictionnaire Des Aliments Pour Les Animaux," Edagricole 419-420 (1965).
Prosky and Hoebregs, "Methods to Determine Food Inulin and Oligofructose," *J. Nutr.* 129(Suppl):1418S-1423S (1999).
Reply to the Official Communication Under A96(2) for EP 02766984.5, submitted Jan. 10, 2005.
Rijnen et al., "Effects of Dietary Fermentable Carbohydrates on Energy Metabolism in Group-Housed Sows," *J. Anim. Sci.* 79(1):148-154 (2001).
Roberts et al., "The Influence of Dietary Composition on Energy Intake and Body Weight," *J. Am. Coll. Nutr.* 21(2): 140S-145S (2002).
Rokey, G.J., "Petfood and Fishfood Extrusion," The Technology of Extrusion Cooking 144-145 (1995).
Ross Tech 99/37, "Role of Antibiotic as Growth Promoter," printout from world.rossbreeders.com (1999); cited in opposition of European Patent Application No. EP 02766984.5 on Aug. 17, 2009.
Schooneveld-Bergmans, "Physicochemical Characteristics of Wheat Bran Glucuronoarabinoxylans," *J. Cereal Sci.* 29(1):49-61 (1999).
Search Report for GB Application No. 0612976.1, mailed Oct. 30, 2006, date of search Oct. 27, 2006.
Shiiba et al., "Purification and Characterization of Two Arabinoxylans from Wheat Bran," *Cereal Chem.* 70(2):209-214 (1993).
Smith et al., "Energy Balance and Thermogenesis in Rats Consuming Nonstarch Polysaccharides of Various Fermentabilities," *Am. J. Clin. Nutr.* 68(4):802-819 (1998).
Sørensen et al., "Efficiencies of Designed Enzyme Combinations in Releasing Arabinose and Xylose from Wheat Arabinoxylan in an Industrial Ethanol Fermentation Residue," *Enzyme and Microbial Technology* 36:773-784 (2005).
Sørensen et al., "Optimization of Reaction Conditions for Enzymatic Viscosity Reduction and Hydrolysis of Wheat Arabinoxylan in an Industrial Ethanol Fermentation Residue," *Biotechnol. Prog.* 22:505-513 (2006).
Supplemental Search Report for British Application No. GB0612976.1, dated Nov. 1, 2006.
Van Craeyveld et al., "Structurally Different Wheat-Derived Arabinoxylooligosaccharides Have Different Prebiotic and Fermentation Properties in Rats," *Journal of Nutrition* 138:2348-2355 (2008).
Van Laere et al., "Fermentation of Plant Cell Wall Derived Polyaccharides and Their Corresponding Oligosaccharides by Intestinal Bacteria," *J. Agric. Food Chem.* 48(5):1644-1652 (2000).
Van Loo et al., "Functional Food Properties of Non-Digestible Oligosaccharides: A Consensus Report from the Endo Project (DGXII AIRII-CT94-1095)," *Br. J. Nutr.* 81(2):121-132 (1999).
Voragen, "The Cell Wall and its Components in Cereals and Pulse Grains, Consequences on Nutritional Value," *Cah. Options Mediterr.* 26:119-123 (1997).
Yamada et al., "Preparation of a New Arabinoxylooligosaccharide from Wheat Bran Hemicellulose and Its Structure," *Biosci. Biotech. Biochem.* 58(2):288-292 (1994).

\* cited by examiner

(ARABINO)XYLAN OLIGOSACCHARIDE PREPARATION

CROSS REFERENCE TO RELATED APPLICATIONS

This application is the U.S. national stage filing under 35 U.S.C. §371 of international application PCT/BE2009/000020, filed Mar. 25, 2009, which claims the benefit of British Patent Application No. GB 0805360.5, filed Mar. 25, 2008.

FIELD OF THE INVENTION

The present invention relates to preparations comprising (arabino)xylan-oligosaccharides, which are particularly useful as food or beverage ingredients or as nutritional supplements as well as to methods for producing such preparations. The invention further relates to the use of said preparations for improving gastro-intestinal health of human beings through the supplementation of their diets therewith.

BACKGROUND OF THE INVENTION

Arabinoxylan (AX), also referred to as pentosan, is a major constituent in the cell wall of many plant species. For instance in cereal grains, AX occurs at 5-10% of dry weight of the grains. In general, AX from cereals consists of a backbone of beta-(1-4)-linked D-xylopyranosyl residues (xylose), some of which are mono- or disubstituted with alpha-L-arabinofuranosyl residues (arabinose) (Izydorczyk and Biliaderis, 1995). The ratio of arabinose to xylose (average degree of arabinose substitution) in cereal AX ranges from 0.10 to over 1.0, depending on tissue and plant species. In addition, more minor, substituents can be attached to the xylose residues such as acetyl, alfa-glucuronyl, alfa-4-O-methylglucuronyl, galacturonyl, xylosyl, rhamnosyl, galactosyl, or glucosyl side chains, or short oligosaccharide side chains (Izydorczyk and Biliaderis, 1995; Andersson and Aman, 2001). Hydroxycinnamic acids, mainly ferulic acid, and to a lesser extent dehydrodiferulic acid, p-coumaric acid, or sinapic acid, are present as substituents as well, and they are generally linked to the C—(O)-5 position of terminal arabinose units (Izydorczyk and Biliaderis, 1995; Andersson and Aman, 2001). From a dietary point of view, arabinoxylan has raised interest as some types of oligosaccharides derived by enzymatic or chemical cleavage of arabinoxylan have been shown to exert prebiotic properties (WO2006/002495; Courtin et al. 2008).

Prebiotics are compounds, usually oligosaccharides, that can not be digested by enzymes of the upper gastro-intestinal tract but are fermented selectively by some types of intestinal bacteria in the large intestine (Gibson and Roberfroid, 1995; Roberfroid, 1988; Van Loo, 2004). Ingestion of prebiotics causes a shift in the composition of the intestinal bacterial population, typically characterised by a relative increase in *Lactobacillus* and *Bifidobacterium* species. This shift in the intestinal microbiota is associated with improved overall health, reduced gut infections, better absorption of minerals, and suppression of colon cancer initiation (Van Loo, 2004; Macfarlane et al. 2006).

Fermentation of prebiotics by colonic bacteria gives rise to production of short chain fatty acids (SCFA) such as acetate, propionate, butyrate and lactate, which act as electron sinks of respiration in the anaerobic environment of the gut. The presence of SCFA in the intestines contributes to a lower pH, a better bio-availability of calcium and magnesium, and inhibition of potentially harmful bacteria (Teitelbaum and Walker, 2002; Wong et al. 2006). Among the SCFA, butyrate appears to be of greatest interest as butyrate is a preferred energy source for colonocytes (Roediger, 1982), stimulates colon epithelial cells, thereby increasing the absorptive capacity of the epithelium (Topping and Clifton, 2001), and inhibits the growth of colonic carcinoma cells, both in vitro and in vivo (Scheppach et al 1995). The cancer-suppressing properties of dietary fibres appear to correlate with their ability to generate butyrate upon colonic fermentation (Perrin et al. 2001).

The selective stimulation by prebiotics of certain colonic bacteria, such as *Lactobacilli* and *Bifidobacteria*, which typically use saccharolytic pathways to fuel their energy needs, is in some cases paralleled by suppression of protein fermentation in the colon (van Nuenen et al. 2003; De Preter et al. 2004; Geboes et al. 2005). Reduced protein fermentation in the colon is a desired outcome, as the amino acid degradation pathways in bacteria result in the production of potentially toxic catabolites such as ammonia, amines, phenols, indoles, and thiols, some of which have been implicated in bowel cancer (Bone et al 1976; Johnson, 1977; Visek 1978) and in exacerbation of diseases such as ulcerative colitis (Ramakrishna et al 1991).

Preparations of xylo-oligosaccharides (XOS, oligosaccharides consisting of $\beta$-1,4-linked D-xylopyranosyl units) with predominance of oligosaccharides with a degree of polymerisation (DP) of 2-3 (xylobiose and xylotriose), have been shown to cause a significant increase in the level of *Bifidobacteria* and SCFA in the faeces and caecum of rats (EP 0265970B1; Campbell et al., 1997; Hsu et al., 2004), and the colon of humans (Okazaki et al., 1990). Such xylobiose-rich XOS preparations also suppress early symptoms of chemical-induced colon carcinogenesis in rats (Hsu et al., 2004) and enhance the absorption of calcium in the colon (Toyoda et al., 1993). A preparation consisting predominantly of arabino-xylo-oligosaccharides (AXOS) with a DP of 3-5 (arabinosylxylobiose, arabinosylxylotriose, arabinosylxylotetraose, and diarabinosylxylotetraose) has also been shown to increase the levels of *Bifidobacteria* in the intestines of rats and mice (Yamada et al., 1993). Experiments described in WO2006/002495 have provided evidence that AXOS with an intermediate average DP (avDP) ranging from 5 to 50 have better prebiotic properties than AXOS with higher avDP, and are less sweet than AXOS preparations with a lower avDP. Addition of such AXOS preparations to the diet causes a significant increase in the number of *Bifidobacteria* present in the caecum of chickens, caecum of rats, and faeces of humans (WO2006/002495).

For optimal health promoting effects it is furthermore desirable that hydroxycinnamic acids such as ferulic acids are bound to the arabinose side chains of AXOS compounds. Feruloylated AXOS have antioxidant properties due to the presence of ester-linked ferulic acid moieties (Ohta et al 1997; Katapodis et al 2003; Yuan et al 2005), and antioxidants are well known to exert health-related beneficial effects (Ratnam et al 2006). The ester bond that links hydroxycinnamic acids to arabinose side chains of arabinoxylans are cleaved in alkaline media (Rosazza et al 1995; Lozovaya et al 1999). In this respect, the arabinoxylanoligosaccharide-containing preparation described by Yamada et al (1993) is suboptimal as the alkaline treatment used for extraction of arabinoxylans leads to removal of a large fraction of the ferulic acid side chains.

A further important aspect of AXOS-containing preparations intended for food, food ingredient, or nutritional supplement applications is that it has a pleasant and more preferably a neutral taste, since otherwise it may adversely affect the enjoyment and sensory perception of the intake of a product containing that preparation. Moreover, the presence of coloured impurities in (arabino)xylan-oligosaccharide-containing preparations should be avoided such that the preparation does not or only minimally influences the colour of the food or nutritional supplement product in which it is formulated, and no significant colour and taste change should occur upon heating of the nutritional supplement product in which it is formulated.

It is an object of the present invention to provide (arabino) xylan-oligosaccharide preparations comprising a mixture of xylo-oligosaccharides and arabinoxylo-oligosaccharides wherein at least part of said arabinoxylo-oligosaccharides are substituted with hydroxycinnamic acids. The average degree of polymerisation and the overall average degree of arabinose substitution of said xylo- and arabinoxylo-oligosaccharides being selected in order to obtain optimal gastrointestinal health effects upon ingestion of appropriate quantities of said oligosaccharides. At the same time the said food ingredient has a neutral taste and a white or slightly off white colour, which are stable during thermal processing of the ingredient. This thermal stability of the organoleptic and colour properties of the ingredient is particularly useful in the production of thermally processed foods enriched with such mixture of xylo-oligosaccharides and arabinoxylo-oligosaccharides.

SUMMARY OF THE INVENTION

The present invention provides (arabino)xylan-oligosaccharide preparations extracted from arabinoxylan-containing plant material. These (arabino)xylan-oligosaccharide preparations are particularly useful as food or beverage ingredients or as nutritional supplements and are optimized in order to provide optimal health benefits, while being well suited to be processed into a wide range of food products, in particular thermally processed food products. The invention further provides methods for producing (arabino)xylan-oligosaccharide preparations according to the present invention, in particular preparations comprising a low nitrogen and gluten content.

DETAILED DESCRIPTION

List of Figures

FIG. 1: Effect of different oligosaccharides on the level of acetate (A), propionate (B) and butyrate (C), and summed isovalerate and isobutyrate (D) in the caecum of rats after 14 days of feeding. The bars marked with one or two asterisks are significantly different from the control group at $p<0.05$ or $p<0.01$, respectively. Numbers above the bars represent averages of the measurements and error bars indicate the standard deviation.

Figure 2:
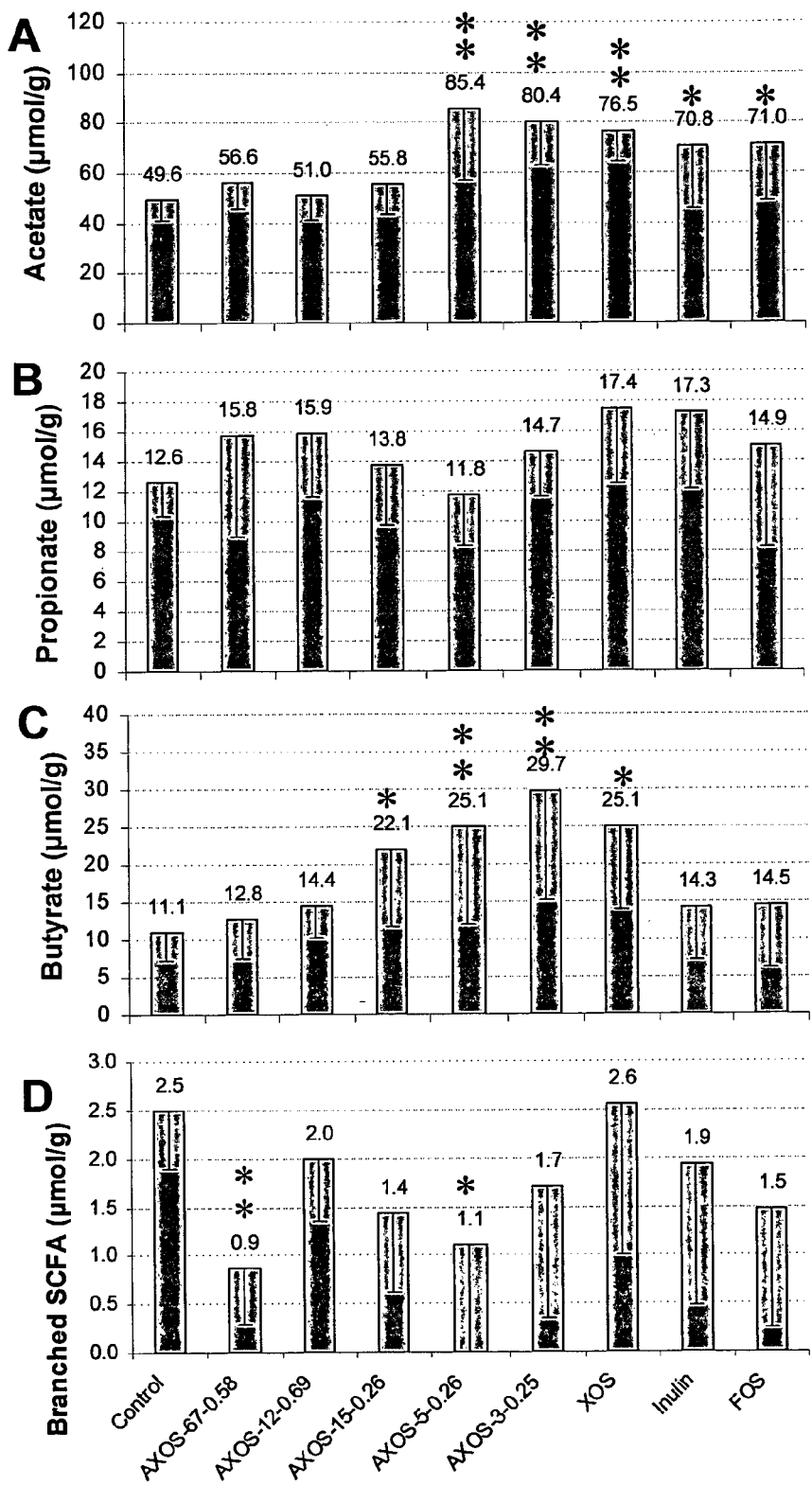

FIG. 2: Effect of different oligosaccharides on the level of acetate (A), propionate (B) and butyrate (C) and summed isovalerate and isobutyrate (D) in the colon of rats after 14 days of feeding. The bars marked with one or two asterisks are significantly different from the control group at $p<0.05$ or $p<0.01$, respectively. Numbers above the bars represent averages of the measurements and error bars indicate the standard deviation.

Figure 3:
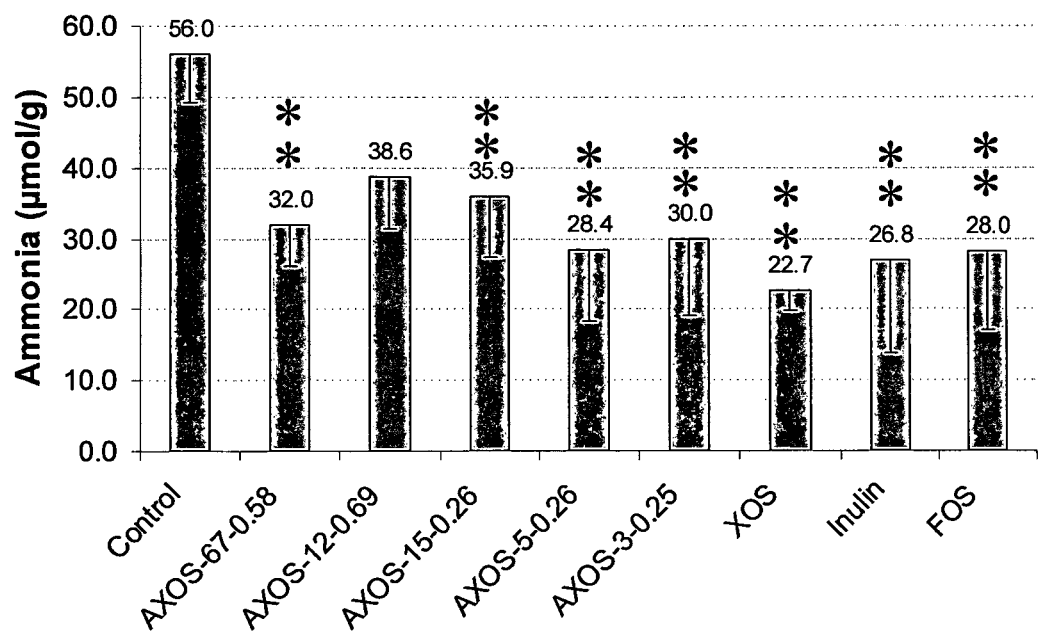

FIG. 3: Effect of different oligosaccharides on the level of ammonium in the caecum of rats after 14 days of feeding. The bars marked with one or two asterisks are significantly different from the control group at $p<0.05$ or $p<0.01$, respectively. Numbers above the bars represent averages of the measurements and error bars indicate the standard deviation.

Figure 4:
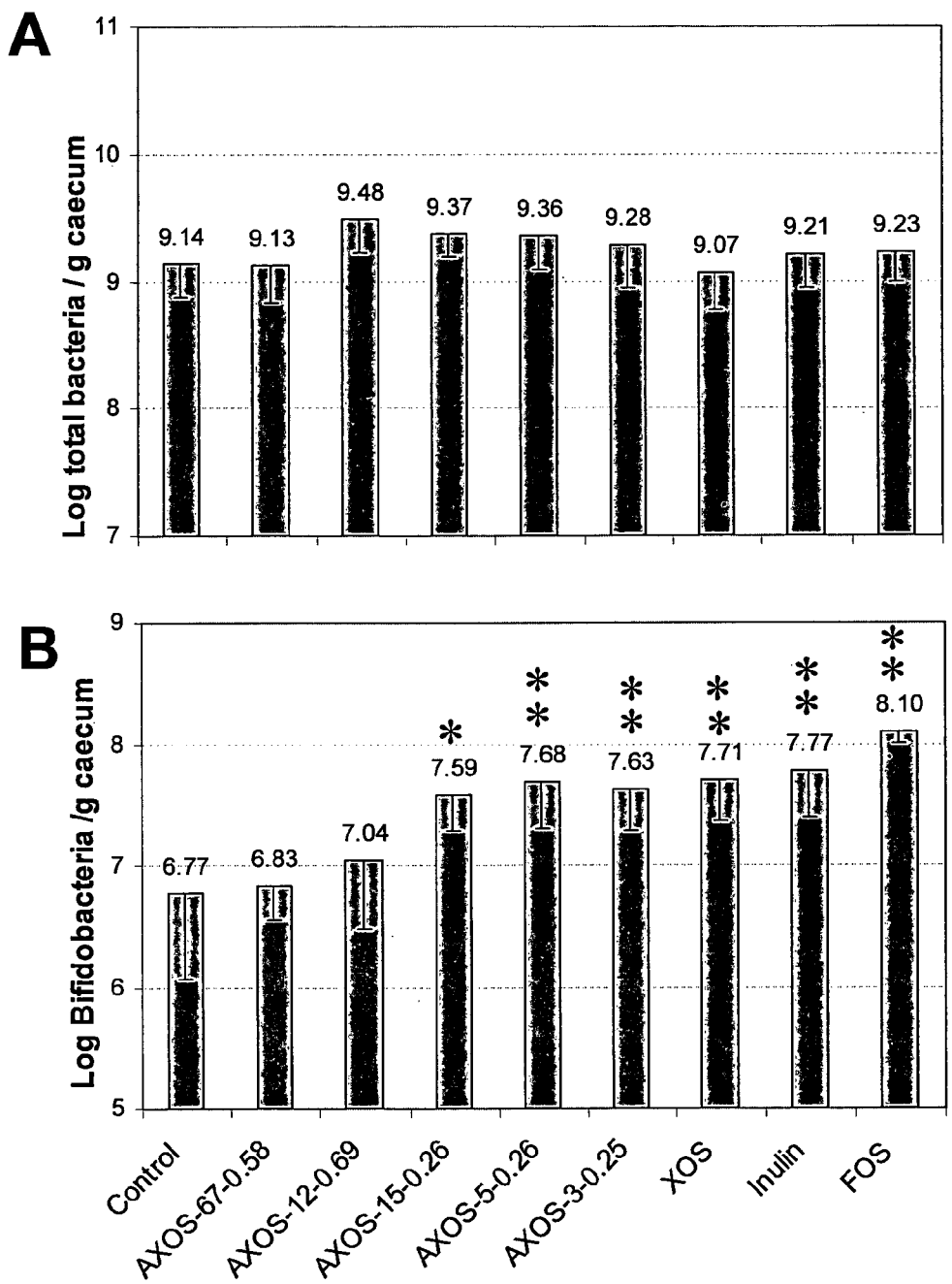

FIG. 4: Effect of different oligosaccharides on the level of total bacteria (A) and *Bifidobacteria* in the caecum of rats after 14 days of feeding. The bars marked with one or two asterisks are significantly different from the control group at $p<0.05$ or $p<0.01$, respectively. Numbers above the bars represent averages of the measurements and error bars indicate the standard deviation.

Figure 5:
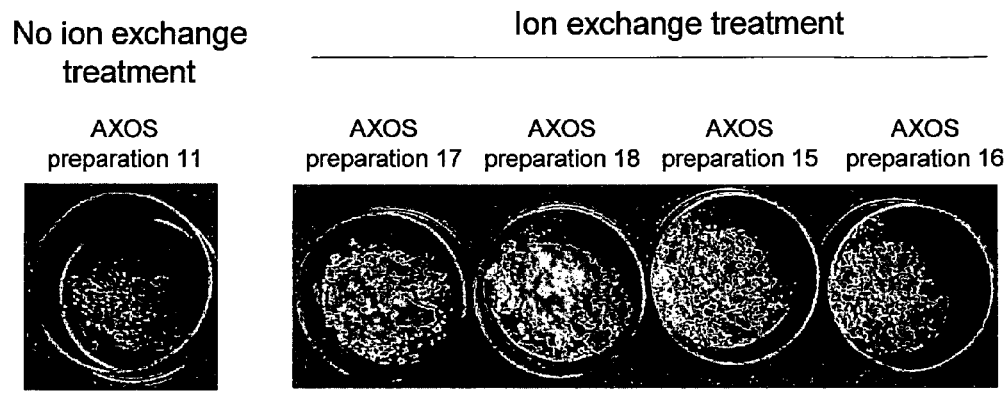

FIG. 5: Picture of 0.5 g quantities of (A)XOS preparation 11 (no ion exchange treatment) and (A)XOS preparations 15, 16, 17, 18 that have undergone ion exchange treatment No 1, 2, 3 and 4, respectively, after exposure for 3 h at 130° C.

Figure 6:
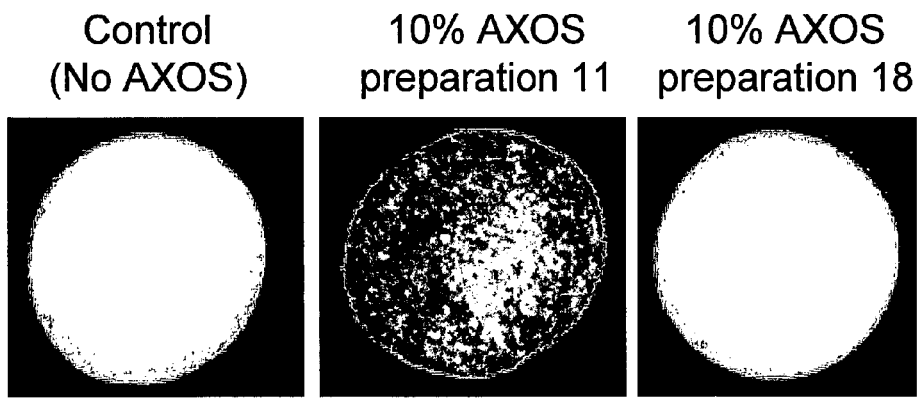

FIG. 6: Picture of cookies prepared without (A)XOS, with 10% of (A)XOS preparation 11 (no ion exchange treatment), and with (A)XOS preparation 18 (ion exchange treatment No 4).

DESCRIPTION

The present invention provides (arabino)xylan-oligosaccharide preparations extracted from arabinoxylan-containing plant material. These (arabino)xylan-oligosaccharide preparations are particularly useful as food or beverage ingredients or as nutritional supplements and are optimized in order to provide optimal health benefits, while being well suited to be processed into a wide range of food products, in particular thermally processed food products.

The health benefits of the (arabino)xylan-oligosaccharide preparations according to the present invention are associated with the chemical properties of the mixture of xylo- and arabinoxylo-oligosaccharides comprised therein. Studies in rats fed humanized diets showed that an optimal prebiotic effect was obtained when (arabino)xylan-oligosaccharides mixtures with an overall average degree of polymerization (avDP) between 4 and 10 and an overall average degree of arabinose substitution (avDAS) between 0.15 and 0.35 were incorporated in the diets. More particularly, it was seen that the supplementation of a humanized rat diet with such (arabino)xylan-oligosaccharide mixtures resulted in a stronger suppressing effect on protein fermentation and a stronger acetate and butyrate boosting effect than obtained with (arabino)xylan-oligosaccharide mixtures having a lower and higher avDP, respectively. Furthermore, the supplementation of the diets with (arabino)xylan-oligosaccharides with an avDAS exceeding 0.35 had no or only weak prebiotic effects.

Another aspect of the health benefits of the (arabino)xylan-oligosaccharide preparations of the present invention relate to their hydroxycinnamic acid, and more particularly ferulic acid, content, which strongly contributes to the anti-oxidant properties of the preparations of the present invention. The hydroxycinnamic acids are mainly esterified to the arabinose side chains of the arabinoxylo-oligosaccharides. This covalent link to the non-digestible oligosaccharides prevents the release and absorption of the hydroxycinnamic acids in the upper part of the gastro-intestinal tract and thus allows the transport of anti-oxidant activity towards the colon region, where the hydroxycinnamic acids can be released upon fermentation of the oligosaccharides. The ester bound between the hydroxycinnamic acids and the arabinose side-chains is unstable under alkaline conditions (pH>10). Therefore, such alkaline conditions should be avoided throughout the production and preferably also the further processing of said arabinoxylan-oligosaccharides preparations if the presence of hydroxycinnamic substituted arabinoxylo-oligosaccharides is desired.

Further it was found that the concentration of the element nitrogen, as determined by for instance combustion-based methods or the Kjeldahl method, served as a good marker for the presence of undesired taste notes and allowed to predict the formation of off-tastes and/or strong coloring upon heating of the (arabino)xylan-oligosaccharide preparations. Said nitrogen is present in the (arabino)xylan-oligosaccharide preparations as part of organic molecules, such as proteins, peptides and amino acids. Preferably, the nitrogen content of the (arabino)xylan-oligosaccharide preparations according to the present invention is 0.16% (w/w) or less. Below this threshold no noticeable off-tastes and only minor color formation occurred upon heating of the preparation. Dried and powdered (arabino)xylan-oligosaccharide preparations according to the present invention have a $\Delta E^*$ value (Good, 2002) lower than 15, more preferably lower than 12, such as lower than 10, said $\Delta E^*$ value representing the color difference of said powder before and after heat treatment in an oven at 130° C. for 3 h.

So in a first object the present invention provides (arabino) xylan-oligosaccharide preparations for use as food or beverage ingredients or as nutritional supplements. The (arabino) xylan-oligosaccharide preparations according to the present invention are characterized in that the arabinoxylan molecules comprised in said preparations have an avDP between 4 and 10 and an avDAS between 0.15 and 0.35. Preferably the avDP and avDAS are determined using gas chromatography as described in example 1 of the present invention.

It is further preferred that the nitrogen content of the (arabino)xylan-oligosaccharide preparations according to the present invention is 0.16% (w/w) or less. Said nitrogen is present in the preparations as part of organic molecules, such as proteins, peptides and amino acids. Methods for measuring the elemental nitrogen content are well known in the art, examples of such methods are combustion-based methods (Protein (Crude) in Animal Feed: Combustion Method. (990.03) Official Methods of Analysis. 1990. Association of Official Analytical Chemists. 15th Edition). and the Kjeldahl method (Dr. D. Julian McClements. "Analysis of Proteins". University of Massachusetts, http://www-unix.oit.umass.edu/~mcclemen/581Proteins.html).

In a preferred embodiment the (arabino)xylan-oligosaccharide preparations according to the present invention further comprise an amount of ferulic acid corresponding to between 1 and 10% (w/w), for instance between 1 and 5% (w/w) or between 2 and 4% (w/w) of the total (arabino)xylan-oligosaccharides content (T-AX) of said preparations. Preferably, said ferulic acids are covalently bound to the arabinose side chains of arabinoxylo-oligosaccharides in said preparation. Preferably the total (arabino)xylan-oligosaccharides content (T-AX) is determined using the gas chromatographic method as described in example 2.

In another preferred embodiment the (arabino)xylan-oligosaccharide preparations according to the present invention have a low gluten content. Such low gluten content allows to incorporate these preparations in food or beverage products, which normally do not contain gluten, without causing major inconvenience to people who are sensitive to gluten. The preparations according to the present invention preferably contain less than 1000 ppm, more preferably less than 800 ppm, for instance less than 500 ppm gluten.

It is further preferred that the ash content of the (arabino) xylan-oligosaccharide preparations according to the present invention is lower than 1% (w/w), more preferably lower than 0.5% (w/w), for example lower than 0.3% (w/w) of the total dry weight of the preparation.

Preferably, the (arabino)xylan-oligosaccharide preparations according to the present invention are provided as powders with a dry matter content between 90% and 99.9% (w/w) or syrups with a dry matter content between 25% and 75% (w/w). Preferably, the preparations comprise more than 40% (w/w), most preferably more than 50% (w/w), such as more than 60% (w/w), most preferably more than 70% (w/w), for instance more than 80% (w/w) (arabino)xylan-oligosaccharides on the total dry weight of said preparations. Preferably, the arabinoxylan-preparations according to the present invention comprise up to 90% (w/w), more preferably up to 95% (w/w) for instance up to 98% (w/w) of (arabino)xylan-oligosaccharides on the total dry weight of said preparations.

Preferably, the (arabino)xylan-oligosaccharide preparations according to the present invention comprise a well balanced mixture of xylo-oligosaccharides and arabinoxylo-oligosaccharides providing optimal prebiotic effects. Preferably the xylo-oligosaccharide content of said preparations expressed as a percentage of the total (arabino)xylan-oligosaccharide (T-AX) content is at least 30% (w/w) more preferably at least 35% (w/w), most preferably at least 40% (w/w), for instance at least 45% (w/w), said total (arabino) xylan-oligosaccharide (T-AX) preferably being determined using the gas chromatographic method as described in example 1. Preferably, the xylo-oligosaccharide content of said preparations expressed as a percentage of the total (arabino)xylan-oligosaccharide content is below 60% (w/w), more preferably below 55% (w/w), for instance below 50% (w/w). Preferably, the degree of polymerization of the xylan backbone of said xylo-oligosaccharides varies between 2 and 9. Preferably, the arabinoxylo-oligosaccharide content of said preparations expressed as a percentage of the total (arabino) xylan-oligosaccharide content is at least 40% (w/w) more preferably at least 45% (w/w), most preferably at least 50% (w/w), for instance at least 55% (w/w). Preferably, the arabinoxylo-oligosaccharide content of said preparations expressed as a percentage of the total (arabino)xylan-oligosaccharide content is below 70% (w/w), more preferably below 65% (w/w), for instance below 60% (w/w). Preferably, the degree of polymerization of the xylan backbone of said arabinoxylo-oligosaccharides varies between 1 and 9. Furthermore, it is preferred that at least part of the arabinoxylo-oligosaccharides comprised in said (arabino)xylan-oligosaccharide preparations comprise one or more ferulic acids bound to the arabinose side-chains. In a preferred embodiment, the ratio of the content of xylo-oligosaccharides with a degree of polymerisation of the xylan backbone from 2 to 9 ($XOS_{DPX2-9}$) to the content of arabino-xylo-oligosaccharides with a degree of polymerization of the xylan backbone from 1 to 9 ($AXOS_{DPX1-9}$) content is lower than 1.5 such as lower than 1.4, 1.3, or 1.2. Preferably, the ratio of the content of xylo-oligosaccharides with a degree of polymerisation of the xylan backbone from 2 to 9 ($XOS_{DPX2-9}$) to the content of arabino-xylo-oligosaccharides with a degree of polymerization of the xylan backbone from 1 to 9 ($AXOS_{DPRX1-9}$) content is higher than 0.6, such higher than 0.65, 0.7, 0.8 or 0.9. Moreover, it is preferred that more than 90% (w/w), for instance more than 95% (w/w) of the (arabino)xylan-oligosaccharides comprised in the preparations according to the present invention are either xylo-oligosaccharides with a xylan backbone with a degree of polymerization varying between 2 and 9 or arabinoxylo-oligosaccharides with a degree of polymerization varying between 1 and 9.

The (arabino)xylan-oligosaccharide preparations of the present invention are extracted from arabinoxylan-containing plant material, and more preferably from cereal material. However, non-cereal sources such as seeds from *Plantago* or *Gossypium* species can also be rich sources of arabinoxylan. Said (arabino)xylah-oligosaccharide preparations can comprise isolated naturally occurring (arabino)xylan-oligosaccharides or can be obtained by depolymerisation or fragmentation of naturally occuring arabinoxylans or they can be structural analogues produced by chemical, enzymic and/or physical processes. Preferably, the arabinoxylan-containing plant material is bran, inflorescence by-products, stem by-products, or spent grains. More preferably, the arabinoxylan-containing plant material is bran, most preferably bran derived from cereals, such as wheat, durum wheat, rye, oats, barley, maize, sorghum, or rice. Most preferably, the arabinoxylan-containing plant material is wheat bran, for instance durum wheat bran.

In a second object the present invention provides a method for the production of an (arabino)xylan-oligosaccharide preparation according to the present invention using arabinoxylan-containing plant material as a starting material. Said method comprises the mashing of said arabinoxylan-containing plant material in water and treating it with an appropriate concentration of an endoxylanase in order to enzymatically depolymerise a fraction of the arabinoxylans comprised in said plant material. The method further comprises the separation of said mashed plant material into a water-insoluble fraction and a water-solubilised fraction, which comprises the solubilised arabinoxylan depolymerisation products, including the xylo-oligosaccharides and arabinoxylo-oligosaccharides. Thereafter, said water-solubilised fraction is further purified using ion exchange chromatography, optionally preceded by the elimination of at least part of the suspended solids in said water-solubilised fraction by for instance filtration or centrifugation. Preferably, said ion-exchange purification involves passing said water-solubilised fraction over a strong acid cation exchange resin, and subsequently over a weak base anion exchange resin. In a preferred embodiment of the method of the present invention said water-solubilised fraction is first passed over one or a series of strong acid cation exchange resin columns followed by one or a series of a weak base anion exchange columns. After these two first columns or column series, reiterations can be made with strong or weak acid cation exchange resins and weak base anion exchange resins. The last column can optionally be a mixed bed column containing anion exchange resin and a cation exchange resin. It is preferred that the strong acid cation exchange treatment is performed at a temperature higher than 30° C., preferably higher than 40° C., such as higher than 45° C. Suprisingly the ion exchange treatment appeared to be more efficient for removing gluten proteins from said (arabino)xylan-oligosaccharide preparations when the strong acid cation exchange treatment was performed at temperatures above 30° C., for instance above 50° C. Preferably, the strong acid cation exchange treatment is performed at a temperature lower than 90° C., preferably lower than 80° C., such as lower than 70° C. or lower than 65° C. Preferably the weak base anion exchange treatment is performed at a temperature of 20° C. or higher, such as higher than 25° C. Preferably the weak base anion exchange treatment is performed at a temperature lower than 70° C., preferably lower than 60° C., such as lower than 50° C. Further it was observed that the elimination of nitrogen-containing material from said water-solubilised fraction was favored when the pH in the strong acid cation exchange resin was maintained below 3.5, more preferably below 3, for instance at about pH 2.8. To avoid depolymerisation of the (arabino)xylan-oligosaccharides during the passage over the strong acid cation exchange resin it is preferred that the pH is maintained above 2.0.

Following ion-exchange purification said solubilised fraction can be concentrated by either or both evaporation or reversed osmosis in order to obtain an (arabino)xylan-oligosaccharide-containing syrup, which can optionally be dried using for instance spray drying to obtain a powder.

In a preferred embodiment the arabinoxylan-containing plant material used as starting material in the extraction method according to the present invention is destarched plant material. More preferably, said destarched plant material is obtained by mashing arabinoxylan-containing plant material in water in the presence of an appropriate concentration of an a-amylase and subsequently separating the insoluble destarched plant material from the liquid fraction containing the solubilised starch derived material.

Suitable commercial enzyme preparations with predominant endoxylanase activity suitable for use in the method according to the present invention include, but are not limited to, Shearzyme™ 500L (Novozymes), Pentopan™ Mono BG (Novozymes), Pulpzyme™ (Novozymes), Ecopulp™ TX-200A (AB Enzymes), Veron™ 191 (AB Enzymes), Veron™ Special (AB Enzymes), Multifect™ CX 12 L (Genencor/Danisco), Grindamyl™ H640 (Danisco), and Grindamyl™ Powerbake™ (Danisco). The arabinoxylan hydrolysis step involves incubation for an appropriate duration of time, such as, but not limited to, between 1 h and 24 h, of the slurry at temperatures and pH values as recommended by the commercial developer of the enzyme cocktail used for arabinoxylan hydrolysis. Preferably, the endoxylanase is an endoxylanase with high selectivity for WU-AX, with a substrate selectivity factor (SSFCHROM), as defined in Moers et al. (2005), that is at least 2 or higher, preferably at least 3 or higher, such as 4 or higher. The endoxylanase is preferably an endoxylanase of Glycosyl Hydrolase Family 11 (Henrissat 1991). Enzyme components of the enzyme preparation can include, but are not limited to, arabinofuranosidases, beta-glucanases, exoxylanases, beta-xylosidases, and/or xylobiases.

In a third object the present invention provides a method to determine the content of xylo-oligosaccharides with a degree of polymerisation of the xylan backbone from 2 to 9 ($XOS_{DPX2-9}$) and the content of arabino-xylo-oligosaccharides with a degree of polymerization of the xylan backbone from 1 to 9 ($AXOS_{DPX1-9}$). The method comprises measuring the content in total and free ferulic acid by High Performance Liquid Chromatography (HPLC) and detection by light absorption at 310 nm (Hartmann, G., Piber, M, Koehler, P. Isolation and chemical characterisation of water-extractable arabinoxylans from wheat and rye during breadmaking. Eur Food Res Technol (2005) 221:487-492) and measuring the content of xylo-oligosaccharides by high-performance anion-exchange chromatography with pulsed amperometric detection (HPAEC-PAD) in a sample following a 24 hours incubation of said sample at 90° C. in a buffered solution at pH 7.0 and at pH 2.8, respectively. The % (w/w) of dry matter of XOS with a degree of polymerisation of the xylan backbone from 2 to 9 [% $XOS_{DPX2-9}$] in a sample is determined according to formula (a). The % (w/w) of dry matter of (feruolylated) arabino-xylo-oligosaccharides with a degree of polymerization of the xylan backbone from 1 to 9 [% $AXOS_{DPX1-9}$] in a sample was calculated according to formula (b).

$$[\% \ XOS_{DPX2-9}] = [\% \ X2_{H2O} + \% \ X3_{H2O} + \ldots + \% \ X9_{H2O}] \quad (a)$$

$$[\% \ (F)AXOS_{DPX1-9}] = [(A_{HCl} - A_{H2O} + 150/194 \times bFA) \times 0.88 + \quad (b)$$
$$(\% \ X_{HCl} + \% \ X2_{HCl} + \% \ X3_{HCl} + \ldots + \% \ X9_{HCl}) -$$
$$(\% \ X_{H2O} + \% \ X2_{H2O} + \% \ X3_{H2O} + \ldots + \% \ X9_{H2O}) +$$
$$(0.907 \times bFA)]$$

In the above formulae, the compound abbreviations with the $H_2O$ and HCl subscripts refer to the concentrations as % (w/w) of dry matter sample of the corresponding compound in the water-treated and HCl-treated samples, respectively. The factor 0.88 corrects for the incorporation of water during hydrolytic release of arabinose. bFA is the content of bound ferulic acid (determined as total ferulic acid minus free ferulic acid and expressed as % w/w of dry matter sample), and bFA×150/194 refers to the content of feruloylated arabinose (arabinose that is equimolarly linked to bound ferulic acid). The factor 0.907 corrects for the incorporation of water during alkaline hydrolytic release of ferulic acid. The calculation of the $XOS_{DPX2-9}$ and $AXOS_{DPX1-9}$ according to formulae (a) and (b) uses the assumptions that (i) the difference in concentration of X, X2, X3 . . . X9 between HCl-treated sample and water-treated sample results from acid-mediated arabinose release from $(F)AXOS_{DPX1-9}$; (ii) no hydrolysis of the beta-(1-4)-D-xylopyranosyl linkages occurs in the HCl-treated samples; (iii) all hydroxycinnamic acids in the sample are present in the form of ferulic acid; (iv) all bound ferulic acid is linked to arabinose side chains of arabino-xylo-oligosaccharides.

In a fourth object the present invention provides a food or beverage product comprising an (arabino)xylan-oligosaccharide preparation according to the present invention as well as methods for producing such food or beverage, said methods involving the addition of such (arabino)xylan-oligosaccharide preparation to said food or beverage during the production thereof. In a preferred embodiment the food or beverage product comprises between 0.25 and 10 g of an (arabino)xylan-oligosaccharide preparation according to the present invention per serving. In a more preferred embodiment the food or beverage product comprises between 0.5 and 5 g of an (arabino)xylan-oligosaccharidepreparation according to the present invention per serving. In an even more preferred embodiment the food or beverage product comprises between 1 and 5 g per serving of an (arabino)xylan-oligosaccharidepreparation according to the present invention. In another preferred embodiment the food or beverage product comprises between 0.25 and 10 g per serving of (arabino)xylan-oligosaccharides having an avDP comprised between 4 and 10 and an avDAS comprised between 0.15 and 0.35. In a more preferred embodiment the food or beverage product comprises per serving between 0.25 and 5 g of (arabino)xylan-oligosaccharides having an avDP comprised between 4 and 10 and an avDAS comprised between 0.15 and 0.35. In an even more preferred embodiment the food or beverage product comprises per serving between 1 and 5 g of (arabino)xylan-oligosaccharides having an avDP comprised between 4 and 10 and an avDAS comprised between 0.15 and 0.35. As indicated above preparations according to the present invention are particularly suited as a beneficial additive to low calorie foods.

Food or beverage products that can beneficially be supplemented with the (arabino)xylan-oligosaccharide preparations of the present invention are for example, but without limitation, dairy products such as milk, yoghurt or fresh cheese, non-alcoholic soft drinks, fruit juices, fruit spreads, soybean-based food and beverages, chocolates, cookies, bars, candies, desserts such as dessert puddings, ground meat products, and pet food.

In general, food products having cereals or cereal derived material as an ingredient naturally contain arabinoxylans. However, the arabinoxylans comprised in these food products are either long-chain natural arabinoxylans with a DP of over 6000 or partially depolymerised arabinoxylans having a DP of at least 200 to 300. Therefore, the enrichment of said food products with arabinoxylans according to present invention also improves their nutritional value. Preferably, such enrichment is obtained by adding a given amount of an (arabino)xylan-oligosaccharide preparation of the present invention as an ingredient during the preparation of cereal-containing food products. It is clear that such enrichment results in a cereal-containing food product comprising arabinoxylans having a DP of 200 and higher next to a population of (arabino)xylan-oligosaccharides having a DP below 200, said population being characterised by an avDP comprised between 4 and 10 and an avDAS comprised between 0.15 and 0.35. Cereal-containing products that can beneficially be supplemented with the (arabino)xylan-oligosaccharide preparations of the present invention are for example, but without limitation, bakery product such as bread, pastry products such as cake, ready-to-eat cereals, cereal bars, or pasta.

In a fifth object the present invention provides a food supplement product comprising an (arabino)xylan-oligosaccharide preparation according to the present invention. In a preferred embodiment the food supplement product is a capsule, tablet, powder, syrup or the like. In a more preferred embodiment the food supplement product is formulated such that it allows a daily administration of 0.25 and 10 g of (arabino)xylan-oligosaccharides having an avDP comprised between 4 and 10 and an avDAS comprised between 0.15 and 0.35, more preferably between 0.5 and 5 g, for instance between 1 and 5 g.

The term "xylo-oligosaccharides", in the context of the present invention, refers to poly- or oligosaccharides consisting of unsubstituted beta-(1-4)-linked D-xylopyranosyl residues (xylose) with a degree of polymerisation between 2 and 100, preferably between 2 and 20.

The term "arabino-xylo-oligosaccharides", abbreviated as AXOS, in the context of the present invention, refers to poly- or oligosaccharides comprising a backbone of beta-(1-4)-linked D-xylopyranosyl residues (xylose) with a degree of polymerisation of the backbone between 1 and 100, preferably between 1 and 20, with at least one alpha-L-arabinofuranosyl (arabinose) residue linked to one of the xylose residues of the backbone per molecule. Other substituents such as acetyl, alfa-glucuronyl, alfa-4-O-methylglucuronyl, galacturonyl, xylosyl, rhamnosyl, galactosyl, or glucosyl side chains, or short oligosaccharide side chains, can be attached to one or more of the xylose residues and hydroxycinnamic acids, such as ferulic acid, dehydrodiferulic acid, p-coumaric acid, caffeic acid or sinapic acid, can be linked to one or more of the arabinose units.

The term "(arabino)xylan oligosaccharides", abbreviated as (A)XOS, in the context of the present invention, refers to either xylo-oligosaccharides or arabino-xylo-oligosaccharides, or mixtures of xylo-oligosaccharides and arabino-xylo-oligosaccharides.

The term "cereal", in the context of the present invention, refers to plants of the botanical family of the Poaceae, including but not limited to species such a wheat, barley, oat, rye, sorghum, maize, and rice.

The term "bran" in the context of the present invention, means a cereal grain-derived milled fraction enriched in any or all of the tissues to be selected from aleurone, pericarp, seed coat, sepals, and petals, as compared to the corresponding intact cereal grain.

The term "serving" or "serving size" refers to an amount customarily consumed per eating occasion by a healthy average person. Food producers typically indicate the serving size on the nutritional label of a food product and within the national food label legislations certain jurisdictions provide specific guidance as how to define the serving size for a given food product. See for instance the US code of federal regulations Title 21-Food and Drugs §101.12.

The invention is further illustrated by way of the illustrative embodiments described below.

Illustrative Embodiment

EXAMPLES

Example 1

Effect of (A)XOS Preparations on Intestinal Parameters

Materials and Methods

Preparation of (A)XOS with avDP of 67 and avDAS of 0.58 (AXOS-67-0.58). The starting material for the preparation of AXOS-67-0.58 was the commercial product Wheat Pentosan Concentrate (WPC, Pfeifer & Langen, Dormagen, Germany) whose chemical composition has been described in detail by Courtin and Delcour (1998). The WPC was solubilised in deionised water (1:10 w/v) and silica was added as an aqueous suspension (20% w/v) until a silica/protein ration of 7:1. De pH of the mixture was adjusted to 4.8 using 0.1 M HCl in order to obtain a maximal adsorption of the proteins to the silica. After 30 min stirring the suspension was Büchner filtered. The residue comprising the silica/protein was discarded. Ethanol (95% v/v) was added to the filtrate under continuous stirring to a final concentration of 65% (v/v) and after stirring for an additional 30 min, settling (24 h, 4° C.) and centrifugation (10,000×g for 30 minutes at 4° C.), the obtained residue was dissolved in deionised water and lyophilised. The obtained material was homogenised and sieved through a 250 μm sieve.

Preparation of (A)XOS with avDP of 12 and avDAS of 0.69 (AXOS-12-0.69). AXOS-12-0.69 was prepared starting from the commercial product Wheat Pentosan Concentrate (WPC, Pfeifer & Langen, Dormagen, Germany). WPC was treated with silica to remove proteins as described for the preparation of AXOS-67-0.58. The recovered filtrate was further incubated at 30° C. during 24 h with a glycoside hydrolase family (GHF) 10 endoxylanase from *Aspergillus aculeatus* (Shearzyme 500L, Novozymes, Bagsvaerd, Denmark) at 29 units per g Wheat Pentosan Concentrate. After inactivation of the enzyme by boiling (30 min), the obtained solution was cooled and subjected to an ethanol precipitation. Ethanol (95% v/v) was added under continuous stirring to a final concentration of 65% (v/v) and after stirring for an additional 30 min, settling (24 h, 4° C.) and centrifugation (10,000×g for 30 minutes at 4° C.), the precipitated material was removed. Ethanol (95% v/v) was added to the supernatant under continuous stirring to a final concentration of 80% (v/v) and after stirring for an additional 30 min, settling (24 h, 4° C.) and centrifugation (10,000×g for 30 minutes at 4° C.), the obtained residue was dissolved in deionised water and lyophilised. The obtained material was homogenised and sieved through a 250 μm sieve.

Preparation of (A)XOS with avDP of 15 and avDAS of 0.26 (AXOS-15-0.26). Commercial wheat bran (Dossche Mills & Bakery, Deinze, Belgium) was used as starting material for the preparation of AXOS-15-0.26. A suspension of wheat bran in water (1:7 w/v) was first treated with a thermostable α-amylase (Termamyl 120LS, Novozymes, Bagsvaerd, Denmark; 1 μl/g wheat bran) for 90 min at 90° C. to hydrolyse the starch. After cooling to 50° C., the pH of the suspension was adjusted to 6.0 using concentrated HCl and the suspension was incubated with a protease (Neutrase 0.8L, Novozymes, Bagsvaerd, Denmark; 40 μl/g wheat bran) for 4 h at 50° C. to hydrolyse residual proteins (an optional step in the preparation). Thereafter, the suspension was boiled during 20 min, filtered and the filtrate discarded. The residue was washed with water, and resuspended in deionised water (1:14 w/v). The suspension was incubated under continuous stirring for 10 h at 50° C. with a GHF11 endoxylanase from *Bacillus subtilis* (Grindamyl H640, Danisco, Denmark) at 1.4 units per g destarched and deproteinised wheat bran, and for another 10 h at 50° C. after addition of a second dose of a GHF11 *Bacillus subtilis* endoxylanase at 1.1 units per g destarched and deproteinised wheat bran. After inactivation of the enzyme by boiling (30 min), the solution was concentrated till 20% dry matter in a falling film evaporator and finally dried in a spray-drier.

Preparation of (A)XOS with avDP of 5 and avDAS of 0.26 (AXOS-5-0.26). AXOS-6-0.26 was prepared by incubating a solution (1:10 w/v) of AXOS-15-0.26 at 30° C. during 1 h with XAA, a GHF10 endoxylanase from *Aspergillus aculeatus* (Shearzyme 500L, Novozymes, Bagsvaerd, Denmark) at 75 units per g AXOS-15-0.26. After inactivation of the enzyme by boiling (30 min), the solution was lyophilised and the obtained material was homogenised and sieved through a 250 μm sieve.

Preparation of (A)XOS with avDP of 3 and avDAS of 0.25 (AXOS-3-0.25). Commercial wheat bran (Dossche Mills & Bakery, Deinze, Belgium) was destarched and deproteinised as described for the preparation of AXOS-15-0.26. The destarched and deproteinised wheat bran was incubated under continuous stirring for 10 h at 50° C. with a GHF11 endoxylanase from *Bacillus subtilis* (Grindamyl H640, Danisco, Denmark) at 1.2 units per g destarched and deproteinised wheat bran, and for another 10 h at 50° C. after addition an endoxylanase from *Aspergillus aculeatus* (Shearzyme 500L, Novozymes, Bagsvaerd, Denmark) at 21 units per g destarched and deproteinised wheat bran. After inactivation of the enzymes by boiling (30 min), the solution was concentrated till 20% dry matter in a falling film evaporator and finally dried in a spray-drier.

XOS preparation. XOS was the commercial oligosaccharide preparation Xylooligo-95P (Suntory Ltd., Tokyo, Japan). This product consists predominantly of xylobiose, xylotriose, and xylotetraose (Moura, et al. 2006).

FOS and inulin preparations. The Fructo-oligosaccharide (FOS) preparation was the commercial product Raftilose (Orafti, Tienen, Belgium). The inulin preparation was the commercial product Raftilin (Orafti, Tienen, Belgium).

Characterisation of the Isolated Preparations.

Different techniques were used to characterise the oligosaccharide preparations.

Total and reducing end sugar content was determined by gas-liquid chromatographic analysis as described by Courtin et al. (2000). For determination of total sugar content, 20 mg samples were hydrolyzed by suspending in 5 ml 2.0 M trifluoroacetic acid (2.0 M) and incubation at 110° C. for 60 minutes. After the hydrolysis, the mixture was filtered and 3.0 ml of the filtrate was further treated by adding 1.0 ml of an internal standard solution (100 mg beta-D-allose in 100 ml of a 50% saturated benzoic acid solution), 1.0 ml of ammonia solution (25% v/v) and 3 drops of 2-octanol. The monosaccharides were reduced to alditols by addition of 200 μl of sodium borohydride solution (200 mg sodium borohydride in 1.0 ml 2 M ammonia) and the sample was incubated for 30 minutes at 40° C. The reaction was stopped by addition of 400 μl of glacial acetic acid. For the acetylation reaction, 500 μl of the sample containing the alditols was added to 5.0 ml of acetic anhydride and 500 μl of 1-methyl-imidazole. After 10 minutes, the excess of acetic anhydride was removed by addition of 900 μl ethanol to the sample. Alditol acetates were then concentrated in the organic phase by addition of water (10 ml) and potassium hydroxide solution (2 times 5.0 ml of 7.5 M solution, with an intermediate rest of a few minutes). Bromophenol blue solution (500 µl, 0.04% w/v) was added as indicator for the aqueous phase. Aliquots of 1 µl of the organic phase containing the formed alditol acetates were separated by gas chromatography on a Supelco SP-2380 polar column (30 m×0.32 mm I.D.; 0.2 µm film thickness) (Supelco, Bellefonte, Pa., USA) in an Agilent chromatograph (Agilent 6890 series, Wilmington, Del., USA) equipped with autosampler, splitter injection port (split ratio 1:20) and flame ionisation detector. The purified monosaccharides D-glucose, D-mannose, D-galactose, D-xylose, and L-arabinose were treated in parallel with each set of samples for calibration purposes.

For determination of the reducing end sugar content, 40 mg samples were suspended in 2.5 ml water, with addition of 500 µl of an internal standard (100 mg beta-D-allose in 100 ml of a 50% saturated benzoic acid solution), 50 µl ammonia solution (25% v/v) and 9 drops of 2-octanol. The saccharides were reduced to alditols by addition of 200 µl of sodium borohydride solution (200 mg sodium borohydride in 1.0 ml 2 M ammonia) and the sample was incubated for 30 minutes at 40° C. The reaction was stopped by the addition of 400 µl glacial acetic acid. An aliquot of 2.5 ml of the sample containing reduced saccharides was hydrolyzed by addition of 500 µl trifluoroacetic acid (99%) and the sample was incubated at 110° C. for 60 minutes. After hydrolysis, acetylation and gas chromatography analysis was performed as described above. The purified monosaccharides D-glucose, D-xylose, and L-arabinose were treated in parallel with each set of samples for calibration purposes.

The average degree of polymerisation of (A)XOS (avDP) was calculated using formula (1).

The average degree of arabinose substitution (avDAS or NX ratio) of (A)XOS was calculated using formula (2). The total arabinoxylan (T-AX, also mentioned below as (A)XOS content) of samples was calculated using formula (3).

$$\text{avDP}=(\% \text{ arabinose}+\% \text{ xylose})/\% \text{ reducing end xylose} \quad (1)$$

$$\text{avDAS}=(\% \text{ arabinose}-0.7\times\% \text{ galactose})/\% \text{ xylose} \quad (2)$$

$$T\text{-}AX=(\% \text{ arabinose}-0.7\times\% \text{ galactose})*132/150+ ((132\times(\text{avDP}-1)+150))/(150\times\text{avDP})\times\% \text{ xylose} \quad (3)$$

The subtraction of the % galactose in formulae (2) and (3) is meant as a correction for the soluble arabinogalactan content in cereals.

Moisture and ash contents were analysed according to AACC methods 44-19 and 08-01, respectively (Approved Methods of the American Association of Cereal Chemist, 10th edition. 2000. The Association, St. Paul, Minn., USA).

Nitrogen content and deduced protein contents were determined according to the Dumas combustion method, using an automated Dumas protein analysis system (EAS varioMax N/CN, Elt, Gouda, The Netherlands) that follows an adaptation of the AOAC Official Method for protein determination (Association of Official Analytical Chemists. Official Methods of Analysis, 16th edition. 1995. Method 990.03. AOAC Washington D.C., USA). The protein content was deduced by multiplying the nitrogen content with the factor 5.7.

Determination of the activity of the xylanolytic enzymes. Endoxylanase activity was determined using insoluble azurine cross-linked arabinoxylan (Xylazyme AX tablets, Megazyme, Bray, Ireland) as described in Megazyme Data Sheet 9/95. The enzymes Grindamyl H640 (Danisco, Copenhagen, Denmark) and Shearzyme 500L (Novozymes, Bagsvaerd, Denmark) were assayed in appropriate dilutions in 25 mM sodium acetate buffer, pH 4.7, at 40° C. during 10 minutes. The absorbance at 590 nm was measured with an Ultraspec III UV/Visible spectrophotometer (Pharmacia Biotech, Uppsala, Sweden). One Unit (U) of enzyme activity was the amount of enzyme required to yield an absorbance of 1.0 after 10 minutes at 590 nm under the assay conditions.

Short chain fatty acid analysis. To vials containing intestinal samples (2 g) the following was added: 0.5 ml 9.2 M sulfuric acid, 0.4 ml of 0.75% (v/v) 2-methylhexanoic acid (internal standard), 0.4 g NaCl and 2 ml diethyl ether. After shaking the vials for 2 minutes, the vials were centrifuged (3 min at 3000×g) and the diethyl ether phase transferred to glass vials. The diethyl ether phase containing the organic acids was analysed on a gas-liquid chromatograph (Di200, Shimadzu) equipped with a EC-1000 Econo-Cap column (Alltech, Laarne, Belgium; dimensions: 25 m×0.53 mm, film thickness 1.2 µm; acid-modified polyethylene glycol as liquid phase) and a flame ionization detector. Nitrogen was used as a carrier gas at a flow rate of 20 mL per minute and the column temperature and injector temperature were set at 130 and 195° C., respectively. Concentrations of SCFAs were calculated based on standards with known concentrations of the different acids. 2-Methyl hexanoic acid was used as an internal standard.

Ammonium analysis. Ammonium in intestinal samples was liberated as ammonia by the addition of MgO (0.4 g per g sample), and the released ammonia was distilled from the sample into a boric acid solution (20 g/l) using a 1062 Kjeltec Auto Distillation apparatus (FOSS Benelux, Amersfoort, The Netherlands). Ammonia was then determined by titration using a 665 Dosimat (Metrohm, Berchem, Belgium) and 686 Titroprocessor (Metrohm).

Microbiological analyses by quantitative PCR. Extraction of metagenomic DNA from caecal samples was performed using the QIAamp DNA Stool Mini kit (Qiagen, Venlo, The Netherlands) according to the manufacturer's instructions and starting from 0.2 g of sample. DNA concentrations were measured spectrophotometrically using a NanoDrop ND-1000 spectrophotometer (Isogen, IJselstein, The Netherlands). DNA amplification was performed in 25 µl reaction mixtures by using buffers supplied with the qPCR Core Kit for SYBR® Green I as described by the supplier (Eurogentec, Liege, Belgium) in MicroAmp Optical 96-well reaction plates with optical caps (PE Applied Biosystems, Nieuwerkerk a/d Ijssel, The Netherlands) using an ABI Prism SDS7000 instrument (PE Applied Biosystems). Forward primers 338f (Lane et al 1991) and 518r (Muyzer et al 1993) were used at a concentration of 0.3 µM for detection of copies of the 16S ribosomal RNA genes from total bacteria, using the following PCR temperature program: 50° C. for 2 min, 95° C. for 10 min, followed by 40 cycles of 94° C. for 1 min, 53° C. for 1 min, and 60° C. for 2 min. Forward and reverse primers, 242f and 243r respectively (Rinttilä et al., 2004), were used at a concentration of 0.3 µM for detection of copies of the 16S ribosomal RNA genes from bacteria of the genus *Bifidobacterium*, using the following PCR temperature program: 50° C. for 2 min, 95° C. for 10 min, followed by 40 cycles of 94° C. for 20 sec, 58° C. for 30 sec, and 60° C. for 1 min. The template DNA was amplified in triplicate reaction mixtures. Standard curves for quantification of *Bifidobacteria* were constructed based on real-time PCR amplification in triplicate reactions on six different dilutions of DNA extracted from a culture of *Bifidobacterium breve* (strain LMG11042), and from a culture of *Lactobacillus brevis* (strain LMG 12023) for quantification of total bacteria. Real-time PCR data from the experimental samples were plotted against the standard curve and corrected for efficiency of DNA extraction using a factor consisting of the average DNA concentration of all samples divided by the DNA concentration of the individual experimental sample.

Statistical analyses. The effect of diets on different parameters was analysed by the non-parametric Kruskal-Wallis test at the 95% confidence level using the Analyse-it software, version 2.07. In case a statistically significant effect was observed for the factor diet, differences between each of the test diets and the control diet were analysed with Bonferroni error protection at the 95% confidence level.

Different (A)XOS types, differing in average degree of polymerisation (avDP) and/or degree of arabinose substitution (avDAS), were prepared in order to determine the structural requirements for optimal beneficial effects on gut health parameters. The properties of the different preparations in terms of total arabinoxylan content (T-AX), avDAS, and avDP are shown in Table 1. All preparations were at least 70% pure in terms of (arabino)xylan content, and their avDP ranged from 3 to 67, and their avDAS from 0.25 to 0.69. These different (A)XOS preparations were included in "humanised" rat diets (Table 2), which mimicked the average Western human diet composition, and fed to rat populations. For comparative purposes, commercial xylooligosaccharides (XOS) with an average DP of 3 and avDAS of 0.09 (Table 1), and the fructan-type oligosaccharides fructo-oligosaccharides (FOS) and inulin were included in the tests as well. The rats were thus used as an in vivo model to study the effect of dietary inclusion of different types oligosaccharides in mammalians.

Ninety (90) 6-week-old male rats (Wistar) were purchased from Elevage Janvier (Le Genest-St-Isle, France) and housed in stainless steel wire-bottom cages (2 rats per cage) in an environmentally controlled room (22° C.) with a 14-10 h light-dark cycle. Rats were given free access to water and to pellets (10 mm) of a 'basic humanised diet' during 6 days. The composition of the 'basic humanised diet' is given in Table 2. After 6 days of adaptation on the basic humanised diet, the rats were randomly assigned to one of 9 different treatment groups (10 rats/group), and the groups were each given free access to pellets (10 mm) of one of the following diets during 14 days:

Basic humanised diet
Basic humanised diet+5.48% AXOS-67-0.58 preparation (3.9% pure (arabino)xylan)
Basic humanised diet+4.49% AXOS-12-0.69 preparation (4.0% pure (arabino)xylan)
Basic humanised diet+5.26% AXOS-15-0.26 preparation (3.8% pure (arabino)xylan)
Basic humanised diet+5.15% AXOS-5-0.26 preparation (3.8% pure (arabino)xylan)
Basic humanised diet+4.44% AXOS-3-0.25 preparation (3.6% pure (arabino)xylan)
Basic humanised diet+4.61% XOS preparation (3.9% pure (arabino)xylan)
Basic humanised diet+4.21% Inulin preparation (4.0% pure inulin)
Basic humanised diet+4.21% FOS preparation (4.0% pure FOS)

The concentrations indicated between brackets were corrected for their purity as calculated by their polymeric AX content or fructo-oligosaccharide content. For the oligosaccharide-containing diets, the starch in the basic humanised diet was replaced with the appropriate amount of oligosaccharide preparation.

Animals were weighed and feed intake was measured 3 times per week. After 14 days of treatment, all animals were weighed and euthanized with an overdose of 5-ethyl-5-(1-methylbutyl)-2,4,6(1H,3H,5H)-pyrimidinetrione (Nembutal™). Thereafter, the animals were dissected to collect the caecum content and colon content.

Feed intake during the first week and second week of the treatment period was on average 21 and 21.2 g/rat/day, respectively. Body weights of the rats at the start of the treatment were on average 252 g, and reached on average 311 g and 360 g after 1 week and 2 weeks of treatment, respectively (Table 3). No significant differences in body weight or daily feed intake were be observed between the different treatments.

As increased intestinal SCFA levels are a hallmark of shifts in the intestinal microflora induced by intake of prebiotic compounds (Macfarlane et al 2006), the concentration of the main SCFA, acetate, propionate and butyrate, were measured in caecum and colon for the different treatment groups. As shown in FIG. 1, caecal levels of acetate, propionate and butyrate did not differ significantly between any of the oligosaccharide treatment groups and the control group. There was however a trend for increased caecal butyrate in the groups fed AXOS-15-0.26, AXOS-5-0.26, AXOS-3-0.25, and XOS, which had butyrate levels that were between 65% and 70% higher relative to the control group. In the colon, significant increases of acetate levels were observed in rats fed diets containing either AXOS-5-0.26, AXOS-3-0.25, XOS, inulin or FOS (FIG. 2A), whereas no significant differences in propionate levels were noted (FIG. 2B). Colonic butyrate levels were significantly increased in the AXOS-15-0.26, AXOS-5-0.26, AXOS-3-0.25,. and XOS groups by more than 2-fold compared to the control group (FIG. 2C).

The branched SCFA isobutyrate, and isovalerate are formed during the catabolism of branched chain amino acids valine, leucine, isoleucine (Mortensen et al. 1992; Macfarlane and Macfarlane, 1995), and are an indicator of protein fermentation in the gut. The caecal and colonic contents of the rats were therefore assessed for the branched SCFA isobutyrate and isovalerate. As shown in FIG. 1D, significant reductions in caecal branched SCFA levels were observed in the AXOS-67-0.58, AXOS-12-0.69, AXOS-15-0.26, and AXOS-5-0.26 groups, but not in the AXOS-3-0.25, XOS, inulin and FOS groups. In the colon, levels of branched SCFA were significantly lower for rats fed AXOS-67-0.58 and AXOS-5-0.26, but not in the other groups (FIG. 2D).

Ammonium levels in the caecum were significantly reduced for all groups fed oligosaccharide preparations, except for the AXOS-12-0.69 group (FIG. 3). Reduced ammonium levels can be explained by reduced protein fermentation, but also by increased assimilation by carbohydrate fermenting bacteria (Mortensen et al. 1992).

The amount of total bacteria and of bifidobacteria in the caecum were measured by quantitative PCR. No significant differences were observed in the amount of total bacteria in any of the treatments (FIG. 4A). However, the bifidobacterial content of the caecum was significantly increased in rats fed any the oligosaccharide preparations versus the control treatment, except for the AXOS-67-0.58 and AXOS-12-0.69 groups (FIG. 4B). The highest increase in caecal bifidobacteria was observed in the FOS group, and the bifidobacterial levels of the AXOS-5-0.26, AXOS-3-0.25, XOS and inulin groups were similar and about 1 log unit higher than that of the control group. *Bifidobacteria* have been positively associated with animal and human health and are components of many probiotic compounds. There has been an increasing interest in selectively enriching these bacterial populations within the gastro-intestinal tract, in addition to directly feeding microbial preparations, to promote or maintain a positive health status in animals and humans, including a suppressive effect on colorectal cancer (Gibson and Roberfroid 1995).

The results indicate that among the (A)XOS preparations tested, AXOS-5-0.26 exhibits the best combination of desirable effects on gut health parameters, that is to say increased acetate and butyrate levels in the colon, reduced markers of intestinal protein fermentation (reduced branched SCFA in colon and caecum, and reduced ammonia levels in the caecum), and increased levels of bifidobacteria in the caecum. The effects of AXOS-15-0.26 were relatively similar to those of AXOS-5-0.26, except that they were generally less outspoken and that AXOS-15-0.26 did not cause a significant increase in colonic acetate levels nor a significant reduction of branched SCFA concentrations in the colon. (A)XOS and XOS preparations with a lower avDP (AXOS-3-0.25 and XOS) caused increased acetate and butyrate production and boosted bifidobacterial levels, but failed to significantly lower branched SCFA levels. On the other hand, the (A)XOS preparations with the highest avDP, AXOS-67-0.58, was effective at suppressing branched SCFA, and thus at tipping the balance away from protein fermentation, but did not increase colonic butyrate levels nor did it stimulate bifidobacteria. The degree of arabinose substitution of (A)XOS has a strong influence on the prebiotic potency, as can be deduced from a comparison of the effects of AXOS-15-0.26 and AXOS-12-0.69, which have a similar avDP but a clearly different avDAS. The preparation with the highest avDAS, AXOS-12-0.69, has no significant effect on any of the measured parameters except for a reduction of branched SCFA in the caecum, whereas AXOS-15-0.26 stimulates production of acetate and butyrate in the colon, boosts bifidobacteria in caecum, and reduces ammonia and branched SCFA levels in the caecum. In comparison to AXOS-5-0.26, the fructan-based oligosaccharides FOS and inulin entail similar bifidogenic effects, yet they only cause an increase in production of the SCFA acetate but not of butyrate, and are not effective at reducing the branched SCFA.

(A)XOS preparations with an optimal combination of desirable effects on gut health parameters are those having an avDP between 4 and 10 and an avDAS between 0.15 and 0.35.

Example 2

(A)XOS Preparations with Average DP Between 4 and 10: Characterisation of Ferulic Acid Content Materials and Methods Preparation of destarched cereal bran. Wheat bran (derived from a dry roller mill) was suspended in water (1:8 w/v) in a stirred tank and the mash was heated to 90° C. An α-amylase preparation (Termamyl 120LS, Novozymes, Bagsvaerd, Denmark; 1 ml/kg bran) was added and allowed to react under continuous stirring for 90 min at 90° C. to hydrolyse the starch. The slurry was filtered and the filter cake washed with demineralised water at 80° C. at a ratio of demineralised water volume over cake volume of 3:1. The washed residue was called destarched wheat bran. The destarched wheat bran had a total arabinoxylan content (T-AX) of 37% (w/w dry matter).

Rye bran (derived from a dry roller mill) was suspended in water (1:8 w/v) in a stirred tank and the mash was heated to 90° C. An α-amylase preparation (Termamyl 120LS, Novozymes, Bagsvaerd, Denmark; 1 ml/kg wheat bran) was added and allowed to react under continuous stirring for 90 min at 90° C. to hydrolyse the starch. The slurry was filtered and the filter cake washed with demineralised water at 80° C. at a ratio of demineralised water volume over cake volume of 3:1. The washed residue was called destarched rye bran. The destarched rye bran had a total arabinoxylan content (T-AX) of 40% (w/w dry matter).

Chemical characterisation of the isolated preparations. Characterisation of the (A)XOS preparations was performed as described in example 1. Total ferulic acid content of (A)XOS samples was determined on 30-50 mg samples suspended in sodium hydroxide (2 ml; 2 M, oxygen-free). The headspace over the solution was purged with nitrogen and hydrolysis of bound ferulic acid was conducted for 18 h at room temperature. o-Coumaric acid (100 µl, 100 mg/l) was added as an internal standard and the solution was acidified with hydrochloric acid (1 ml; 25% m/m). Then, the solution was extracted three times with ethyl acetate (3 ml, respectively), and the organic phases were combined and dried with nitrogen. The residue was dissolved in methanol (1 ml) and filtered (0.45 µm pore size filter) prior to HPLC analysis. A Kontron Kroma System 2000 HPLC system (Biotek) with a 522 pump module, a 535 UV detector and a Hyperclone 5 µm octadecylsilane (C18) column (250×4.6 mm; Phenomenex) was used. The solvent system was as follows: solvent A, 0.1% (v/v) trifluoroacetic acid (TFA) in water and solvent B, 0.1% (v/v) TFA in methanol. The injection volume was 100 µl, the flow rate was 0.8 ml/min and detection was made by measurement of the absorbance at 310 nm. Elution was started isocratically at 35% solvent B, then a linear gradient from 35 to 95% solvent B at 45 min was applied. Quantization was based on the peak areas at 310 nm and calibration curves were obtained by injection of standard solutions with different molar ratios of ferulic acid and internal standard (1:5, 1:1, 5:1). Free ferulic acid content of (A)XOS samples was determined in the same way as total ferulic acid, except that the initial hydrolysis step in sodium hydroxide was omitted. Bound (mainly ester-linked) ferulic acid content of (A)XOS samples was calculated by subtraction of free ferulic acid content from total ferulic acid content.

Determination of the activity of the xylanolytic enzymes. Endoxylanase activity was determined using insoluble azurine cross-linked arabinoxylan (Xylazyme AX tablets, Megazyme, Bray, Ireland) as described in Megazyme Data Sheet 9/95. The enzymes Grindamyl H640 (Danisco, Copenhagen, Denmark), Shearzyme 500L (Novozymes, Bagsvaerd, Denmark), Multifect CX 12 L (Danisco, Copenhagen, Denmark), Ecopulp TX200 A (AB Enzymes, Darmstadt, Germany), Brewlyve AXC 1500 L (Lyven, Colombelles, France) were assayed in appropriate dilutions in 25 mM sodium acetate buffer, pH 5.6, at 35° C. during 10 minutes. The absorbance at 590 nm was measured with an Ultraspec III UV Nisible spectrophotometer (Pharmacia Biotech, Uppsala, Sweden). One Unit (U) of enzyme activity was the amount of enzyme required to yield an absorbance of 1.0 after 10 minutes at 590 nm under the assay conditions.

Determination of the oxidative radical absorbance capacity (ORAC). The ORAC value was measured by monitoring the decay of fluorescence from fluorescein over time in the presence of the peroxyl radical generating compound 2,2'-Azobis (2-methylpropionamidine) dihydrochloride (AAPH), as described by Ou et al (2001) and as adapted to a microplate reader by Huang et al (2002). The ORAC value was determined using a dilution series of the water-soluble vitamin E analogue, 6-hydroxy-2,5,7,8-tetramethylchroman-2-carboxylic acid (Trolox), as a standard and expressed in µmol Trolox equivalent (TE) per gram.

Destarched wheat bran and rye bran were prepared as described in Materials and Methods. The destarched bran preparations were suspended in a stirred tank in water at a ratio of 1 kg dry matter per 10 kg water and allowed to react under continuous stirring with xylanase preparations. After incubation with the appropriate enzymes for the appropriate periods and a=t the appropriate temperatures, the mashes were filtered. The filtrates were heated for 10 minutes at 90° C. to inactivate the enzymes, centrifuged at 10000×g, and the supernatants were concentrated by evaporation and spray dried.

The incubation conditions specified in Table 4 were optimised to provide (A)XOS preparations with an avDP between 4 and 10, and an avDAS between 0.15 and 0.35. The nitrogen content of the preparations varied from 1.7% (w/w) for samples prepared by incubation of destarched wheat bran with Brewlyve AXC 1500 L enzyme to 0.6% (w/w) for samples prepared by incubation of destarched wheat bran with Multifect CX 12 L enzyme. The free ferulic acid content of the different samples was always very low, below 0.4 mg/g. The ratio of bound (mainly ester-linked) ferulic acid content to (A)XOS content was higher than 1% in the samples, up to 3.4% in samples prepared by incubation of destarched wheat bran with Brewlyve AXC 1500 L.

The (A)XOS preparation number 3 (Table 4) was characterised for its antioxidant capacity using the ORAC assay. The preparation had an ORAC value of 410 μmol Trolox equivalent per gram.

The free and bound (ester-linked) ferulic acid content of (A)XOS preparation AXOS-5-0.26 described in Example 1 was determined. This preparation had a content of free ferulic acid of 0.25 mg/g and a ratio of bound ferulic acid content to (A)XOS content of 2.5%.

Example 3

Removal of Disturbing Contaminants from (A)XOS Preparations

Materials and Methods

Characterisation of the isolated preparations. Characterisation of the (A)XOS preparations was performed as described in examples 1 and 2.

Ion exchange resin purification. The food-grade ion exchange resins Amberlite FPC22 (strong acid cation exchange resin), Amberlite FPA51 (weak base anion exchange resin), and FPA90 (strong base anion exchange resin) was purchased from Rohm & Haas. Prior to use, the cation exchange resins were brought in the $H^+$ form and the anion exchange resins in the $OH^-$ form. Passage of (A)XOS solutions over the ion exchange resins was done at 4 bed volumes per hour.

Characterisation of the colour of isolated preparations. A colorimeter (model Colorquest 45/0 LAV, CQ/UNI-1600, HunterLab, Reston, Va., USA) was used for all colour determinations. The instrument was calibrated with a white and black calibration tile. The colorimeter was set to an illuminant condition $D_{65}$ (medium daylight) and a 10° standard observer. Each sample was placed in a clear petri dish and covered with a white plate. The colour was measured as L*a*b* colour spaces, developed by the Commission International de l'Eclairage (CIE) in 1976. L* is a measure of the brightness from black (0) to white (100); a* describes red-green colour with positive a* values indicating redness and negative a* values indicating greenness; b* describes yellow-blue colour with positive b* values indicating yellowness and negative b* values indicating blueness. Colour differences (ΔL*, Δa*, Δb*) were evaluated by the difference in L*, a* and b* between a sample and a heated for 3 h at 130° C. in an oven. The total colour difference (ΔE*) was calculated as follows (Good, 2002):

$$\Delta E^* = [(\Delta L^*)^2 + (\Delta a^*)^2 + (\Delta b^*)^2]^{1/2}$$

Preparation of cookies. Cookies without (A)XOS were made from a dough containing 100 g fine wheat flour, 72 g sugar, 45 g baking margarine, 12 g water, and 2 g sodium hydrogencarbonate. Cookies with (A)XOS were made from a dough containing 89 g fine wheat flour, 64 g sugar, 40 g baking margarine, 12 g water, 2 g sodium hydrogencarbonate, and 23 g (A)XOS. The doughs were rolled out to a sheet of 4 mm thickness and round shapes were cut from the dough. Baking was at 190° C. for 15 minutes.

The (A)XOS preparations with average DP between 4 and 10 as described in example 1 and 2 have two drawbacks for use in food preparations. First, they have an unpleasant taste and second they develop coloured products upon heating. After heating, the taste of the products is even further deteriorated.

The (A)XOS preparation number 11 (see example 2, Table 4) was treated in the following 4 ways:

1) Ion exchange treatment No 1: Passage over a column of FPA90 at a temperature of 20° C. and subsequently over a serially connected column of FPC22, at a temperature of 20° C. (preparation 15)
2) Ion exchange treatment No 2: Passage over a column of FPA90 at a temperature of 50° C. and subsequently over a serially connected column of FPC22, at a temperature of 35° C. (preparation 16)
3) Ion exchange treatment No 3: Passage over a column of FPC22 at a temperature of 20° C., subsequently over a serially connected column of FPA51, and subsequently over a serially connected column of FPA90, at a temperature of 20° C. (preparation 17)
4) Ion exchange treatment No 4: Passage over a column of FPC22 at a temperature of 50° C., subsequently over a serially connected column of FPA51 at a temperature of 35° C., and subsequently over a serially connected column of. FPA90, at a temperature of 25° C. (preparation 18)

The preparations obtained after Ion exchange treatment No 1 to 4 were adjusted to pH 6.5, concentrated by evaporation and spray dried. The preparations were subsequently analysed and the results are shown in Table 5. The different ion exchange treatment methods had no significant effect on the avDP and avDAS of the (A)XOS in the preparations, yet they increased (A)XOS content and reduced the mineral and nitrogen content of the preparations. Ion exchange treatment No 3 and No 4 had a similar mineral content (0.4-0.5% w/w on dry matter). The lowest content in nitrogen was obtained for Ion exchange treatment No 4, namely 0.09% w/w on dry weight (Table 5).

The powders before or after Ion exchange treatments No 1 to 4 were dissolved in water at 5% (w/w) and presented in as blind coded samples to a taste panel consisting of 12 persons. The 12 panellists unanimously (12 out of 12) found that the (A)XOS preparation before Ion exchange treatment had the least pleasant taste. Ten out of 12 panellists found that the preparation after Ion exchange treatment No 4 had the most pleasant taste, while 2 out of 12 panellists found that after Ion exchange treatment No 3 had the most pleasant taste.

Dry powders of the (A)XOS preparations before or after Ion exchange treatments No 1 to 4 were heated for 3 hours at 130° C. The powder before Ion exchange treatment showed clear browning upon heat treatment. The powder after Ion exchange treatment No 4 showed the least colour formation, followed by Ion exchange treatment No 3, while powders obtained after Ion exchange treatments No 1 and 2 showed clear colour formation in the form of brown specks (FIG. 5). The colour of the preparations was quantified according to the CIE colour space before and after heat treatment for 3 h at 130° C. (Table 6). The quantification confirms that preparation number 18 is whiter than preparations 16 and 11, and that Ion exchange treatment No 4 reduces the colour formation upon heat treatment.

Cookies were made with 10% (w/w) of the (A)XOS preparation before Ion exchange treatment and 10% after Ion exchange treatment No 4. The cookies made with (A)XOS preparation before Ion exchange treatment showed clear browning (darkening), whereas the cookies made with 10% (A)XOS preparation after Ion exchange treatment No 4 had the same color as cookies without addition of (A)XOS (FIG. 6).

The (A)XOS preparation before Ion exchange treatment had an ORAC value of 370 μmol Trolox equivalent per gram, while the (A)XOS preparation after Ion exchange treatment No 4 had an ORAC value of 280 μmol Trolox equivalent per gram. This indicates that the antioxidant capacity of (A)XOS is largely maintained after the purification procedure. This is also reflected by the level of the bound ferulic acid before and after ion exchange treatment (Table 5).

An (A)XOS preparation was made by treatment of destarched wheat bran, prepared as described in Example 2, with a xylanase under the conditions described for preparation number 4 in Table 4 (preparation 19). This preparation was treated by ion exchange resins in the following way:
1) Ion exchange treatment No 5: Passage over a column of FPC22 at a temperature of 50° C., subsequently over a serially connected column of FPA51, at a temperature of 20° C. (preparation 20)
2) Ion exchange treatment No 6: Passage over a column of FPC22 at a temperature of 20° C., subsequently over a serially connected column of FPA51, at a temperature of 20° C. (preparation 21)

The preparations obtained after Ion exchange treatment No 5 to 6 were adjusted to pH 6.5, concentrated by evaporation and spray dried. The preparations were subsequently analysed and the results are shown in Table 5. The lowest content in nitrogen content obtained for Ion exchange treatment No 5 (preparation 20), namely 0.07% w/w on dry weight (Table 5). Preparation 20 also showed the lowest colour formation upon heat treatment at 130° C. (Table 6). Ion exchange treatment 5 also resulted in the lowest gluten concentration in the final (arabino)xylan-oligosaccharide preparation. The gluten concentration in the (arabino)xylan-oligosaccharide extracts prior to ion exchange purification comprised gluten levels on dry weight of 24000 ppm and more, while after treatment 5 the gluten level in the preparation was about 900 ppm on dry weight. Gluten levels were determined using ELISA by Eurofins Food BV (Heerenveen, The Netherlands).

Example 4

(A)XOS Preparations with Average DP Between 4 and 10: Characterisation of xylo-oligosaccharide and arabino-xylo-oligosaccharide Content Materials and Methods
Chemicals Monosaccharides L-rhamnose, D-xylose (X), L-arabinose (A) and birch wood xylan were purchased from Sigma-Aldrich (Bornem, Belgium). Xylobiose (X2), xylotriose (X3), xylotetraose (X4), xylopentaose (X5), and xylohexaose (X6) were obtained from Megazyme (Bray, Ireland). Xyloheptaose (X7), xylooctaose (X8), and xylononaose (X9), and xylodecaose (X10) were X7, X8, and X9 were prepared by xylanolytic hydrolysis of birch wood xylan from Megazyme (Bray, Ireland) with *Bacillus subtilis* xylanase (Grindamyl H640, Danisco, Copenhagen, Denmark), followed by gel filtration over two serially connected columns filled with Bio-Gel P4 and Bio-Gel P2 matrix (Bio-Rad, Hercules, Calif., USA), respectively.

Determination of Bound Ferulic Acid Content of (arabino) xylan oligosaccharide Preparations.

Total ferulic acid content was determined on 10-50 mg samples suspended in sodium hydroxide (5 ml; 2 M, oxygen-free). The headspace over the solution was purged with nitrogen and hydrolysis of bound ferulic acid was conducted for 18 h at room temperature. o-Coumaric acid (100 μl, 50 mg/100 ml) was added as an internal standard and the solution was acidified with hydrochloric acid (4 ml; 4 M). Then, the solution was extracted three times with ethyl acetate (3 ml, respectively), and the organic phases were combined and dried with nitrogen. The residue was dissolved in methanol (5 ml) and filtered (0.45 μm pore size filter) prior to HPLC analysis.

Free ferulic acid content was determined on 200 mg sample suspended in hydrochloric acid (2 ml; 0.1 M). O-Coumaric acid (50 μl, 50 mg/100 ml) was added as an internal standard. Then, the solution was extracted three times with ethyl acetate (3 ml, respectively), and the organic phases were combined and dried with nitrogen. The residue was dissolved in methanol (2.5 ml) and filtered (0.45 μm pore size filter) prior to HPLC analysis. A Kontron Kroma System 2000 HPLC system (Biotek) with a 522 pump module, a 535 UV detector and a Supersphere 60 RP8 column (125×4.0 mm; Merck) with an ODS2 precolumn (25×4.0 mm; Waters) was used for HPLC analysis for both total and free ferulic acid. The injection volume was 100 μl, the flow rate was 0.8 ml/min and detection was made by measurement of the absorbance at 310 nm. A solvent (water:acetonitrile:acetic acid; 75:25:0.04 v/v/v) was applied isocratically. Quantization was based on the peak areas at 310 nm and calibration curves were obtained by injection of standard solutions with different molar ratios of ferulic acid and internal standard (1:5, 1:1, 5:1). Bound (mainly ester-linked) ferulic acid content was calculated by subtraction of free ferulic acid content from total ferulic acid content.

Determination of the xylo-oligosaccharide and (feruloylated) arabino-xylo-oligosacharide Content of (arabino)xylan oligosaccharide Preparations by HPAEC-PAD.

Dry samples of (arabino)xylan oligosaccharide preparations were treated in parallel as follows:
Untreated sample solution: 25 mg of sample was dissolved in 90 ml distilled water in a 100 ml volumetric flask, the pH was adjusted to 7.0 by addition of either 0.1 M NaOH or 0.1 M HCl, and the volume was adjusted to 100 ml by addition of distilled water.
HCl-treated sample solution: 30 ml was taken from the untreated sample and transferred to a flat bottom screw cap test tube, the pH was brought to 2.8 by addition of a measured amount of 1 M HCl under constant stirring. The acidified solution was heated to 90° C. in a water bath and kept at 90° C. for 24 h in an oven (with closed screw caps), and after cooling to room temperature the pH was adjusted to 7.0 with addition of a measured amount of 0.1 M NaOH under constant stirring.

The mild acidic HCl treatment resulted in a near-quantitative release of the arabinose side chains of (A)XOS while only minimally hydrolyzing the xylan backbone (Swennen et al 2005).

It did, however, not cause hydrolysis of the ester bonds between ferulic acid and the arabinose side chains.

Of each of the untreated and HCl-treated samples, 900 μl was taken and added to 100 μl of 0.2 mg/ml L-rhamnose (internal standard). The samples were centrifuged (10 000×g for 10 minutes) prior to high-performance anion-exchange chromatography with pulsed amperometric detection (HPAEC-PAD). With each set of maximally 20 samples, two calibration samples were analysed. The first calibration sample contained known amounts of L-rhamnose, D-xylose (X), L-arabinose (A), xylobiose (X2), xylotriose (X3), xylotetraose (X4), xylopentaose (X5), and xylohexaose (X6). The second calibration sample contained known amounts L-rhamnose, D-xylose, xyloheptaose (X7), xylooctaose (X8), and xylononaose (X9). HPAEC-PAD was performed with a Dionex ICS-3000 chromatography system (Sunnyvale, Calif., USA). Aliquots of samples (25 µl) were injected on a CarboPac PA-100 guard column (25×4 mm) attached to a CarboPac PA-100 anion-exchange column (250×4 mm). Elution (1.0 ml min-1) was done with 100 mM sodium hydroxide for 5 min, followed by a linear gradient of 0-125 mM sodium acetate in 100 mM sodium hydroxide for 30 min. The gradient was followed by 5 min elution with 400 mM sodium acetate in 100 mM sodium hydroxide to wash the column. The elution was monitored using the electrochemical detector in the pulsed amperometric detection mode for carbohydrate analysis.

For different types of saccharides (SA) the response factors (RF) were determined based on the analysis of a calibration solution containing a known amount of L-rhamnose, L-arabinose (A), D-xylose (X), X2, X3, X4, X5, X6, X7, X8, and X9. L-rhamnose was used as internal standard (IS) to normalize all chromatogram peak areas. A RF is calculated as follows:

$$RF = [(\text{ppm SA/ppm IS}) \times (\text{peak area IS/peak area SA})]$$

The ppm SA and ppm IS in the above formula refer to the concentration in ppm (µg/ml) of SA and IS, respectively, in the calibration solution.

The concentrations of saccharides in a water-treated sample [% $SA_{H2O}$], expressed as % (w/w) of SA on dry matter of the original sample, were calculated from their normalized peak areas and corresponding RF as follows:

$$[\% \ SA_{H2O}] = (\text{peak area } SA_{H2O}/\text{peak area } IS_{H2O}) \times RF \times (\text{ppm IS/ppm sample}) \times 0.1/(0.9 \times \% \ DM \ sample) \times 100$$

The "ppm sample" in the above formula refers to the concentration in ppm (µg/ml) of sample in the untreated sample solution. The ppm IS in the above formula refers to the concentration in ppm (µg/ml) of L-rhamnose in the IS solution. The factors 0.1 and 0.9 take into account the dilution of the IS solution and sample stock solution, respectively, in the final sample prepared for HPAEC-PAD. % DM sample is the % dry matter (w/w) of the original dry sample.

The concentrations of saccharides in a HCl-treated sample [% $SA_{HCl}$], expressed as % (w/w) of SA on dry matter of the original sample, were calculated from their normalized peak areas and corresponding RF as follows:

$$[\% \ SA_{HCl}] = (\text{peak area } SA_{HCl}/\text{peak area } IS_{HCL}) \times RF \times (\text{ppm IS/ppm sample}) \times 0.1/(0.9 \times DF_{pH} \times \% \ DM \ sample) \times 100$$

The "ppm sample" in the above formula refers to the concentration in ppm (pg/ml) of sample in the untreated sample solution. The ppm IS in the above formula refers to the concentration in ppm (µg/ml) of L-rhamnose in the IS solution. The factors 0.1 and $0.9 \times DF_{pH}$ take into account the dilution of the IS solution and sample stock solution, respectively, in the final sample prepared for HPAEC-PAD. $DF_{pH}$ is the dilution factor caused by HCl and NaOH addition, expressed as the ratio of volume before HCl and NaOH addition over volume after HCl and NaOH addition. % DM sample is the % dry matter (w/w) of the original dry sample.

The % (w/w) of dry matter of XOS with a degree of polymerisation of the xylan backbone from 2 to 9 [% $XOS_{DPX2-9}$] in a sample is determined according to formula (a). The % (w/w) of dry matter of (feruolylated) arabino-xylo-oligosaccharides with a degree of polymerization of the xylan backbone from 1 to 9 [% $(F)AXOS_{DPX1-9}$] in a sample was calculated according to formula (b).

$$[\% \ XOS_{DPX2-9}] = [\% \ X2_{H2O} + \% \ X3_{H2O} + \ldots + \% \ X9_{H2O}] \quad (a)$$

$$\begin{aligned}[\% \ (F)AXOS_{DPX1-9}] = &[(A_{HCl} - A_{H2O} + 150/194 \times bFA) \times 0.88 + \\ &(\% \ X_{HCl} + \% \ X2_{HCl} + \% \ X3_{HCl} + \ldots + \% \ X9_{HCl}) - \\ &(\% \ X_{H2O} + \% \ X2_{H2O} + \% \ X3_{H2O} + \ldots + \% \ X9_{H2O}) + \\ &(0.907 \times bFA)] \end{aligned} \quad (b)$$

In the above formulae, the compound abbreviations with the $H_2O$ and HCl subscripts refer to the concentrations as % (w/w) of dry matter sample of the corresponding compound in the water-treated and HCl-treated samples, respectively, determined as set forth in 4.B and 4.C. The factor 0.88 corrects for the incorporation of water during hydrolytic release of arabinose. bFA is the content of bound ferulic acid (determined as total ferulic acid minus free ferulic acid and expressed as % w/w of dry matter sample), and bFA×150/194 refers to the content of feruloylated arabinose (arabinose that is equimolarly linked to bound ferulic acid). The factor 0.907 corrects for the incorporation of water during alkaline hydrolytic release of ferulic acid. For these formulae, the assumptions are made that (i) the difference in concentration of X, X2, X3 ... X9 between HCl-treated sample and water-treated sample results from acid-mediated arabinose release from $(F)AXOS_{DPX1-9}$; (ii) no hydrolysis of the beta-(1-4)-D-xylopyranosyl linkages takes place in the HCl-treated samples; (iii) all hydroxycinnamic acids in the sample are present in the form of ferulic acid; (iv) all bound ferulic acid is linked to arabinose side chains of arabino-xylo-oligosaccharides.

A number of (arabino)xylan oligosaccharide preparations are characterized with respect to their $XOS_{DPX2-9}$ and $(F)AXOS_{DPX1-9}$ content using the HPAEC-PAD-based technique described in this example (Table 7). The preparation AXOS-5-0.26 of Example 1, which was found to exhibit an optimal combination of desirable effects on gut health parameters in the experiments described in Example 1, has $XOS_{DPX2-9}$ content of 33% (w/w on dry matter base) and an $(F)AXOS_{DPX1-9}$ content of 38% (w/w on dry matter base), with a ratio of $XOS_{DPX2-9}/(F)AXOS_{DPX1-9}$ of 0.87. The ratio of $XOS_{DPX2-9}/(F)AXOS_{DPX1-9}$ of AXOS-5-0.26 is significantly higher than for preparation AXOS-12-0.26 (0.12). The $XOS_{DPX2-9}/(F)AXOS_{DPX1-9}$ ratio of preparations 18 and 20 are (0.92 and 1.09, respectively) are in the same range as that of AXOS-5-0.26 and their content of $XOS_{DPX2-9}$ and $(F)AXOS_{DPX1-9}$ is 77% (w/w on dry matter base) and 78%, respectively (Table 7).

REFERENCES

Andersson, R. and Aman, P. (2001) Cereal arabinoxylan: occurrence, structure and properties. In Advanced dietary fibre technology, pp. 301-314 [BV McCleary and L Prosky, editors]. Oxford: Blackwell Science Ltd.

Campbell J. M., Fahey, G. C., Wolf, B. W. (1997) Selected indigestible oligosaccharides affect large bowel mass, cecal and fecal short-chain fatty acids, pH and micorflora in rats. J. Nutr. 127:130-136

Courtin, C. M., Van den Broeck, H. and Delcour, J. A. (2000). Determination of reducing end sugar residues in oligo- and polysaccharides by gas liquid chromatography. Journal of Chromatography A, 866, 97-104.

Courtin, C. M., K. Swennen, W. F. Broekaert, O. Lescroart, O. Onagbesan, J. Buyse, E. Decuypere, T. Van de Wiele, M. Marzoratti, W. Verstraete, G. Huyghebaert, and J. A. Delcour. (2008) Dietary inclusion of wheat bran arabinoxylooligosaccharides has beneficial nutritional effects on chickens. Cereal Chemistry. 85: 607-613.

De Preter V, Geboes K, Verbrugghe K, De Vuyst L, Vanhoutte T, Huys G, Swings J, Pot B, Verbeke K (2004) The in vivo use of the stable isotope-labelled biomarkers lactose-[15N]ureide and [2H4]tyrosine to assess the effects of pro- and prebiotics on the intestinal flora of healthy human volunteers. Brit J Nutrition 92: 439-446.

Englyst, H. N., Cumming, J. H. (1984) Simplified method for the measurement of total non-starch polysaccharides by GLC of constituent sugars as alditol acetates. Analyst 109, 937-942.

Geboes K. P., De Peter V, Luypaerts A., Bammens B., Evenepoel P., Ghoos Y., Rutgeerts P., Verbeke K. (2005) Validation of lactose[15N,15N]ureide as a tool o study colonic nitrogen metabolism. Am J Physiol 288: G994-999.

Gibson, G. R. and Roberfroid M. B. (1995) Dietary modulation of the human colonic microbiota: introducing the concept of prebiotics. J. Nutr. 125: 1401-1412.

Good, H. (2002) Measurement of color in cereal products. Cereal Foods World 47: 5-6.

Grasten S, Liukkonen K-H, Chrevatidis A, El-Nezami H, Poutanen K, Mykkanen H (2003) Effects of wheat pentosan and inulin on the metabolic activity of fecal microbiota and on bowel function in healthy humans. Nutrition Research 23: 1503-1514.

Hsu C-K, Liao, J-W, Chung, Y-C, Hsieh, C-P, Chan, Y-C (2004) Xylooligosaccharides and fructooligosaccharides affect the intestinal microbiota and precancerous colonic lesions development in rats. J. Nutr. 134:1523-1528

Huang D, Ou B, Hampsch-Woodill M, Flanagan J A, Prior R L. (2002) High-throughput assay of oxygen radical absorbance capacity (ORAC) using a multichannel liquid handling system coupled with a microplate fluorescence reader in 96-well format. J Agric Food Chem. 50:4437-4444.

Johnson K. A. (1977) The production of secondary amines by human gut bacteria and its possible relevance to carcinogenesis. Med. Lab. Sci. 34:131-143

Kabel, M. A., Kortenoeven, L., Schols, H. A. & Voragen, A. G. J. (2002). In vitro fermentability of differently substituted xylo-oligosaccharides. Journal of Agricultural and Food Chemistry, 50: 6205-6210.

Katapodis P, Vardakou M, Kalogeris E, Kekos D, Macris B J & Christakopoulos P (2003) Enzymic production of a feruloylated oligosaccharide with antioxidant activity from wheat flour arabinoxylan. European Journal of Nutrition 42: 55-60.

Lozovaya, V. V, Gorshkova, T. A., Yablokova, E. V., Rumyantseva, N. I., Valieva, A., Ulanov, A., Widholm, J. (1999) Cold alkali can extract phenolic acids that are ether linked to cell wall components in dicotyledonous plants (buckwheat, soybean, and flax). Phytochemistry. 50: 395-400.

Macfarlane S and Macfarlane G T (1995) Proteolysis and amino acid fermentation. In: Human Colonic Bacteria: Role in Nutrition, Physiology and Pathology. Gibson G R Macfarlane G T (eds.) CRC Press, Boca Raton, Fla. pp. 75-100.

Macfarlane S, Macfarlane G T, Cummings J H. (2006) Prebiotics in the gastrointestinal tract. Aliment. Pharmacol. Ther. 24:701-14

Mortensen P B, Clausen M R, Bonnen H, Hove H, Holtug K. (1992) Colonic fermentation of ispaghula, wheat bran, glucose, and albumin to short-chain fatty adds and ammonia evaluated in vitro in 50 subjects. J Parenter Enteral Nutr. 16:433-439.

Moura P, Barata R, Carvalheiro F, Girio F, Loureiro-Dias M C & Esteves M P (2007) In vitro fermentation of xylo-oligosaccharides from corn cobs autohydrolysis by *Bifidobacterium* and *Lactobacillus* strains. Lwt-Food Science and Technology 40: 963-972.

Ohta T, Semboku N, Kuchii A, Egashira Y & Sanada H (1997) Antioxidant activity of corn bran cell-wall fragments in the LDL oxidation system. Journal of Agricultural and Food Chemistry 45: 1644-1648.

Okazaki M., Fujikawa, S., Matsumoto, N. (1990) Effect of xylooligosaccharides on the growth of bifidobacteria. *Bifidobacteria* Microflora 9:77-86

Ou, B., Hampsch-Woodill, M., Prior, R. L. (2001) Development and validation of an improved oxygen radical absorbance capacity assay using fluorescein as the fluorescent probe. J Agric Food Chem. 49: 4619-4626

Perrin P, Pierre F, Patry Y, Champ M, Berreur M, Pradal G, Bomet F, Meflah K, Menanteau J (2003) Only fibres promoting a stable butyrate producing colonic ecosystem decrease the rate of aberrant crypt foci in rats. Gut 48:53-61

Ratnam, D. V., Ankola, D. D., Bhardwaj, V., Sahana, D. K., Ravi Kumar, M. N. V. (2006) Review. Role of antioxidants in prophylaxis and therapy: a pharmaceutical perspective. J. Controlled Release. 113: 189-207.

Ramakrishna B. S., Roberts-Thomas I. C., Pannall P. R., Roediger W. E. W. (1991) Impaired sulphation of phenol by the colonic mucosa in quiescent and active colitis. Gut 32:46-49

Rinttila T, Kassinen A, Malinen E, Krogius L, Palva A. (2004) Development of an extensive set of 16S rDNA-targeted primers for quantification of pathogenic and indigenous bacteria in faecal samples by real-time PCR. J. Appl. Microbiol. 97:1166-1177

Roberfroid, M. B. (1998) Prebiotics and synbiotics: concepts and nutritional properties. Brit. J. Nutr. 80:S197-S202.

Roediger W E (1982) Utilization of nutrients by isolated epithelial cells of the rat colon. Gastroenterology 83: 424-429.

Rosazza J P, Huang Z, Dostal L, Volm T, Rousseau B (1995) Review: biocatalytic transformations of ferulic acid: an abundant aromatic natural product. Journal of Industrial Microbiology and Biotechnology 1995. 15:457-471.

Satokari, R. M., Vaughan, E. E., Akkermans, A. D. L., Saarela, M. and De Vos, W. M. (2001) Bifidobacterial diversity in human feces detected by genus-specific PCR and denaturing gradient gel electrophoresis. Appl. Env. Micorbiol. 67:504-513.

Saulnier, L., Vigouroux, J., Thibault, J.-F. (1995) Isolation and partial characterization of feruloylated oligosaccharides from maize bran. Carbohydrate Research.272:, 241-253.

Scheppach W, Barthram H P, Richter F (1995) Role of short-chain fatty acids in the prevention of colorectal cancer. Eur J Cancer 31A:1077-1080.

Swennen, K., Courtin, C. M., Van der Bruggen, B., Vandecasteele, C., Delcour, J. A. (2005) Ultrafiltration and ethanol precipitation for isolation of arabinoxylooligosaccharides with different structures. Carbohydrate Polymers 62: 283-292.

Suntory. Xylo-oligosaccharide, brochure and product sheet, 2001
Teitelbaum, J. E., Walker, W. A. (2002) Nutritional impact of pre- and probiotics as protective gastrointestinal organisms. Annual Review of Nutrition 22: 107-38
Topping D L and Clifton P M (2001) Short-chain fatty acids and human colonic function: roles of resistant starch and nonstarch polysaccharides. Physiol Rev 81:1031-1064
Toyoda, Y., Hatakana, Y., Suwa, Y., (1993) Effect of xylooligosaccharides on calcium absorption. In Proc. of 47th Annual Meeting of Jpn Soc Nutr Food Sci, Tokyo, p 109
Van Loo, J. A. E. (2004) Prebiotics promote good health. The basis, the potential, and the emerging evidence. J Clin Gastroenterol 38: S70-S75.
van Nuenen M. H. M. C., Meyer P. D., Venema K (2003) The effect of various inulins and *Clostridium difficile* on the metabolic activity of the human colonic microbiota in vitro. Microbial Ecol. Health Dis. 15: 137-14
Visek W J. (1978) Diet and cell growth modulation by ammonia. Am J Clin Nutr 31, Supp 10: S216-S220.
Yuan X P, Wang J & Yao H Y (2005) Antioxidant activity of feruloylated oligosaccharides from wheat bran. Food Chemistry 90: 759-764.
Wong, J. M., de Souza, R., Kendall, C. W., Emam, A., Jenkins, D. J. (2006) Colonic health: fermentation and short chain fatty acids. J. Clin. Gastroenterol. 40: 235-243.
Yamada H., Itoh, K., Morishita, Y., Taniguchi, H. (1993) Structure and properties of oligosaccharides from wheat bran. Cereal Foods World 38: 490-492
Muyzer, G., Dewaal, E. C., Uitterlinden, A. G. (1993) Profiling of complex microbial populations by denaturing gradient gel electrophoresis-analysis of polymerase chain reaction-amplified genes coding for 16S rRNA. Appl. Environ. Microbiol. 59, 695-700.
Lane, D. J. (1991) 16S/23S rRNA sequencing. In: Stackebrandt, E., Goodfellow, M. (Eds.), Nucleic Acid Techniques in Bacterial Systematics. John Wiley & Sons Ltd., West Sussex, United Kingdom, pp. 115-175.

Tables

TABLE 1

Properties of different (arabino)xylan preparations.

|  | T-AX | avDAS | avDP |
|---|---|---|---|
| AXOS-67-0.58 | 70.5 | 0.58 | 67 |
| AXOS-12-0.69 | 89.1 | 0.69 | 12 |
| AXOS-15-0.26 | 72.3 | 0.26 | 15 |
| AXOS-5-0.26 | 74.1 | 0.26 | 5 |
| AXOS-3-0.25 | 80.7 | 0.25 | 3 |
| XOS | 83.9 | 0.09 | 3 |

T-AX: total arabinoxylan content expressed as % of dry matter;
avDAS: the average degree of arabinose substitution or arabinose to xylose ratio;
avDP: average degree of polymerisation.

TABLE 2

Compositional analysis of the 'basic humanised diet' used in the rat experiments.

| Composition | |
|---|---|
| Metabolisable Energy (MJ/kg) | 18.7 |
| Dry matter, % | 94.4 |
| Crude protein, % | 20.4 |
| Crude fat, % | 19.2 |
| Crude fibre, % | 1.4 |
| Crude ash, % | 6.2 |
| N free extracts, % | 47.3 |
| Starch, % | 28.2 |
| Sucrose, % | 16.7 |
| Calcium, % | 0.94 |
| Phosphorus, % | 0.70 |
| Sodium, % | 0.35 |
| Magnesium, % | 0.18 |
| Potassium, % | 0.31 |
| Chloride, % | 0.5 |

TABLE 3

Body weight (BW) at days 0, 7 and 14, and daily feed intake (DFI) for the periods 0-7 days and 8-14 days of rats fed diets containing different oligosaccharides.

| Treatment | BW d 0 (g) | BW d 7 (g) | BW d 14 (g) | DFI d 1-d 7 (g) | DFI d 8-d 14 (g) |
|---|---|---|---|---|---|
| Control | 253.9 (7.7) | 308.8 (9.9) | 355.6 (10.0) | 20.2 (0.6) | 19.9 (0.6) |
| AXOS-67-0.58 | 252.4 (5.3) | 315.2 (10.1) | 367.7 (15.8) | 20.9 (0.7) | 21.9 (0.7) |
| AXOS-12-0.69 | 252.6 (8.4) | 314.3 (17.9) | 365.7 (27.0) | 21.2 (1.7) | 21.5 (1.5) |
| AXOS-15-0.26 | 254.2 (7.7) | 312.6 (13.5) | 362.7 (17.0) | 20.8 (1.3) | 21.1 (1.0) |
| AXOS-5-0.26 | 255.2 (7.1) | 312.7 (9.8) | 361.9 (15.1) | 21.3 (0.8) | 21.9 (1.5) |
| AXOS-3-0.25 | 250.8 (10.9) | 303.5 (14.6) | 348.0 (22.0) | 19.8 (1.8) | 20.1 (2.4) |
| XOS | 247.2 (6.7) | 307.6 (10.7) | 355.7 (15.1) | 21.2 (1.3) | 20.7 (1.2) |
| Inulin | 248.6 (11.1) | 314.7 (16.7) | 365.4 (21.7) | 22.2 (0.6) | 22.2 (0.8) |
| FOS | 250 (11.4) | 312.4 (15.3) | 359.5 (20.9) | 21.5 (1.0) | 21.1 (1.4) |

Data are expressed as averages with standard deviations between brackets.

TABLE 4

Analysis of (A)XOS preparations obtained after treatment of destarched cereal brans with different commercial endoxylanase preparations.

| Preparation number | Treated bran | Enzyme | Enzyme dose[a] | Incubation conditions | T-AX[b] | avDAS[c] | avDP[d] | Nitrogen[e] | Bound ferulic acid/ T-AX[f] |
|---|---|---|---|---|---|---|---|---|---|
| 1 | Destarched wheat bran | Ecopulp TX200A | 33000 | 3 h, 70° C. | 71% | 0.23 | 7 | N.D[g] | N.D. |
| 2 | Destarched wheat bran | Ecopulp TX200A | 33000 | 6 h, 70° C. | 78% | 0.23 | 6 | N.D. | N.D. |
| 3 | Destarched wheat bran | Multifect CX 12 L | 150000 | 6 h, 50° C. | 72% | 0.24 | 5 | 0.62 | 3.1% |

TABLE 4-continued

Analysis of (A)XOS preparations obtained after treatment of destarched cereal brans with different commercial endoxylanase preparations.

| Preparation number | Treated bran | Enzyme | Enzyme dose[a] | Incubation conditions | T-AX[b] | avDAS[c] | avDP[d] | Nitrogen[e] | Bound ferulic acid/T-AX[f] |
|---|---|---|---|---|---|---|---|---|---|
| 4 | Destarched wheat bran | Multifect CX 12 L | 150000 | 6 h, 50° C., 0.5 mM Ca(OH)2 | 75% | 0.24 | 6 | N.D. | N.D. |
| 5 | Destarched wheat bran | Multifect CX 12 L | 150000 | 6 h, 50° C., 1.0 mM Ca(OH)2 | 77% | 0.25 | 7 | N.D. | N.D. |
| 6 | Destarched wheat bran | Multifect CX 12 L | 75000 | 6 h, 50° C., 1.0 mM Ca(OH)2 | 78% | 0.24 | 9 | N.D. | N.D. |
| 7 | Destarched wheat bran | Brewlyve AXC 1500 L | 54000 | 6 h, 50° C. | 58% | 0.23 | 5 | 1.69 | 3.4% |
| 8 | Destarched wheat bran | Brewlyve AXC 1500 L | 54000 | 6 h, 55° C. | 60% | 0.24 | 7 | N.D. | N.D. |
| 9 | Destarched wheat bran | Brewlyve AXC 1500 L | 27000 | 6 h, 50° C. | 68% | 0.23 | 7 | N.D. | N.D. |
| 10 | Destarched wheat bran | Grindamyl H640 | 6300 | 8 h, 52° C. | 60% | 0.28 | 8 | N.D. | N.D. |
| 11 | Destarched wheat bran | Grindamyl H640 + Shearzyme 500L | 6300 + 400 | 8 h, 50° C. | 74% | 0.25 | 6 | 0.66 | 3.0% |
| 12 | Destarched rye bran | Ecopulp TX200A | 33000 | 6 h, 70° C. | 89% | 0.21 | 6 | N.D. | N.D. |

[a]expressed as units per kg destarched bran
[b]total arabinoxylan content expressed as % of dry matter
[c]average degree of arabinose substitution of the (A)XOS
[d]average degree of polymerisation of the (A)XOS
[e]expressed as % (w/w) of dry matter
[f]expressed as ratio of bound ferulic acid over total arabinoxylan
[g]N.D. = not determined

TABLE 5

Analysis of (A)XOS preparations before and after different ion exchange treatment methods.

| Preparation Number | Ion exchange treatment number[a] | T-AX[b] | avDAS[c] | avDP[d] | Minerals[e] | Nitrogen[f] | Bound ferulic acid/T-AX[g] |
|---|---|---|---|---|---|---|---|
| 11 (see Table 4) | none | 74% | 0.25 | 6 | 5.0 | 0.66 | 3.0% |
| 15 | No 1 | 76% | 0.24 | 6 | 3.1 | 0.21 | N.D[g] |
| 16 | No 2 | 75% | 0.26 | 6 | 3.2 | 0.24 | N.D. |
| 17 | No 3 | 79% | 0.25 | 6 | 0.4 | 0.16 | N.D. |
| 18 | No 4 | 81% | 0.25 | 6 | 0.5 | 0.09 | 2.1% |
| 19 | none | 65% | 0.22 | 5 | 6.2 | 0.92 | N.D. |
| 20 | No 5 | 77% | 0.22 | 5 | 0.3 | 0.07 | 2.0% |
| 21 | No 6 | 78% | 0.21 | 5 | 0.4 | 0.12 | N.D. |

[a]As described in example 3
[b]total arabinoxylan content expressed as % of dry matter
[c]average degree of arabinose substitution of the (A)XOS
[d]average degree of polymerisation of the (A)XOS
[e]expressed as ash content in % (w/w) of dry matter
[f]expressed as % (w/w) of dry matter
[g]expressed as ratio of bound ferulic acid over total arabinoxylan
[h]N.D. = not determined

TABLE 6

Colour of (A)XOS preparations before and after heat treatment at 130° C. for 3 h.

| Preparation Number | Heat treatment | L* | a* | b* | ΔE* upon heat treatment |
|---|---|---|---|---|---|
| 11 (Table 4) | none | 80.5 | 1.4 | 22.2 | |
| 11 (Table 4) | 3 h at 130° C. | 59.7 | 14.0 | 42.5 | 32 |
| 16 (Table 5) | none | 87.6 | −1.1 | 17.1 | |
| 16 (Table 5) | 3 h at 130° C. | 74.5 | 7.6 | 37.5 | 26 |
| 18 (Table 5) | none | 88.2 | 0.4 | 13.7 | |
| 18 (Table 5) | 3 h at 130° C. | 85.1 | 1.2 | 22.8 | 10 |
| 19 (Table 5) | none | 80.1 | 1.1 | 18.9 | |
| 19 (Table 5) | 3 h at 130° C. | 52.7 | 15.9 | 40.6 | 38 |
| 20 (Table 5) | none | 89.1 | −1.6 | 11.3 | |
| 20 (Table 5) | 3 h at 130° C. | 87.8 | −1.0 | 19.4 | 8 |
| 21 (Table 5) | none | 82.3 | −0.6 | 12.3 | |
| 21 (Table 5) | 3 h at 130° C. | 78.5 | 2.2 | 23.7 | 12 |

L*, a*, b* are CIE colour space parameters.
ΔE* is calculated according to Good (2002).

TABLE 7

Properties of different (arabino)xylan oligosaccharide preparations.

| Preparation ID | $XOS_{DPX2-9}$ | $(F)AXOS_{DPX1-9}$ | $XOS_{DPX2-9}/$ $(F)AXOS_{DPX1-9}$ |
|---|---|---|---|
| AXOS-15-0.26 | 8 | 69 | 0.12 |
| AXOS-5-0.26 | 33 | 38 | 0.87 |
| Number 18 (Table 5) | 37 | 40 | 0.92 |
| Number 20 (Table 5) | 41 | 37 | 1.09 |

$XOS_{DPX2-9}$: content of xylo-oligosaccharides with a degree of polymerisation of the xylan backbone between 2 and 9, expressed as % of dry matter;
$(F)AXOS_{DPX1-9}$: content of (feruloylated) arabino-xylo-oligosaccharides with a degree of polymerisation of the xylan backbone between 1 and 9, expressed as % of dry matter.
$XOS_{DPX2-9}/(F)AXOS_{DPX1-9}$ is the ratio of $XOS_{DPX2-9}$ over $(F)AXOS_{DPX1-9}$.

The invention claimed is:

1. An (arabino)xylan-oligosaccharide preparation comprising (arabino)xylan-oligosaccharides consisting of:
   a mixture of xylo-oligosaccharide and arabinoxylo-oligosaccharide molecules,
   wherein said (arabino)xylan-oligosaccharides represent at least 50% (w/w) of the total dry weight of said preparation, have an average degree of polymerization between 4 and 10 and an average degree of arabinose substitution between 0.15 and 0.35, and
   wherein the nitrogen content of said preparation is 0.16% (w/w) or less on total dry weight of said preparation.

2. The (arabino)xylan-oligosaccharide preparation according to claim 1, further comprising a gluten content below 1000 ppm on total dry weight of said preparation.

3. The (arabino)xylan-oligosaccharide preparation according to claim 1, further comprising a ferulic acid content between 1% and 10% (w/w) of the total (arabino)xylan-oligosaccharide content.

4. The (arabino)xylan-oligosaccharide preparation according to claim 1, further comprising an average degree of polymerization between 4 and 7.

5. The (arabino)xylan-oligosaccharide preparation according to claim 1, wherein between 30% (w/w) and 60% (w/w) of said (arabino)xylan-oligosaccharides are xylo-oligosaccharide molecules.

6. The (arabino)xylan-oligosaccharide preparation according to claim 5, wherein said xylo-oligosaccharides have a xylan backbone with a degree of polymerization varying between 2 and 9.

7. The (arabino)xylan-oligosaccharide preparation according to claim 1, wherein between 40% (w/w) and 70% (w/w) of said (arabino)xylan-oligosaccharides are arabinoxylo-oligosaccharide molecules.

8. The (arabino)xylan-oligosaccharide preparation according to claim 7, wherein said arabinoxylo-oligosaccharides have a xylan backbone with a degree of polymerization varing between 1 and 9.

9. The (arabino)xylan-oligosaccharide preparation according to claim 1, wherein a ratio of the content of xylo-oligosaccharides with a degree of polymerization of the xylan backbone from 2 to 9 to the content of arabinoxylo-oligosaccharides with a degree of polymerization of the xylan backbone from 1 to 9 is between 0.6 and 1.5.

10. The (arabino)xylan-oligosaccharide preparation according to claim 1, wherein more than 90% (w/w) of the (arabino)xylan-oligosaccharides comprised in said preparation are either xylo-oligosaccharides with a xylan backbone with a degree of polymerization varying between 2 and 9 or arabinoxylo-oligosaccharides with a degree of polymerization varying between 1 and 9.

11. The (arabino)xylan-oligosaccharide preparation according to claim 1, further comprising a syrup with a dry matter content between 25% and 75% (w/w).

12. The (arabino)xylan-oligosaccharide preparation according to claim 1, further comprising a powder with a dry matter content between 90% and 99.9% (w/w).

13. The (arabino)xylan-oligosaccharide preparation according to claim 12, further comprising a AE* value below 15, said AE* value representing the color difference of said powder before and after heat treatment in an oven at 130° C. for 3 hours.

14. The (arabino)xylan-oligosaccharide preparation according to claim 1, wherein said (arabino)xylan-oligosaccharides are obtained from arabinoxylan-containing plant material.

15. The (arabino)xylan-oligosaccharide preparation according to claim 14, wherein said arabinoxylan-containing plant material is a cereal or a cereal derived material.

16. The (arabino)xylan-oligosaccharide preparation according to claim 15, wherein said cereal derived material is bran.

17. A method for the production of an (arabino)xylan-oligosaccharide preparation, said method comprising
   mashing of arabinoxylan-containing plant material in water;
   treating the mashed arabinoxylan-containing plant material with an appropriate concentration of an endoxylanase in order to enzymatically depolymerise a fraction of the arabinoxylans comprised in said plant material;
   separating mashed arabinoxylan-containing plant material into a water-insoluble fraction and a water-solubilized fraction comprising solubilized (arabino)xylanoligosaccharides;
   purifying by ion exchange chromatography said water-solubilized fraction over a strong acid cation exchange resin and subsequently over a weak base anion exchange resin,
   wherein said purification reduces a nitrogen content;
   producing an (arabino)xylan-oligosaccharide preparation comprising:
   (arabino)xylan-oligosaccharides consisting of: a mixture of xylo-oligosaccharide and arabinoxylo-oligosaccharide molecules,
   wherein said (arabino)xylan-oliqosaccharide molecules represent at least 50% (w/w) on total dry weight of said preparation, have an average degree of polymerization between 4 and 10 and an average degree of arabinose substitution between 0.15 and 0.35, and
   wherein the nitrogen content of said preparation is 0.16% (w/w) or less on total dry weight of said preparation.

18. The method according to claim 17, wherein said water-solubilized fraction is treated on the strong acid cation exchange resin at a temperature between 30° C. and 90° C.

19. The method according to claim 17, wherein said water-solubilized fraction is treated on the weak anion exchange resin at a temperature between 20° C. and 70° C.

20. The method according to claim 17, wherein said water-solubilized fraction is treated on the strong acid cation exchange resin at a pH between 2 and 3.5.

21. The method according to claim 17, wherein said (arabino)xylan oligosaccharide preparation has a gluten content below 1000 ppm.

22. The method according to claim 17, wherein said (arabino)xylan-oligosaccharide preparation has a ferulic acid content between 1% and 10% (w/w) of the total (arabino)xylan-oligosaccharide content.

23. An (arabino)xylan-oligosaccharide preparation obtainable by a method comprising mashing an arabinoxylan-containing plant material in water;
   treating the mashed arabinoxylan-containing plant material with an appropriate concentration of an endoxylanase in order to enzymatically depolymerise a fraction of the arabinoxylans comprised in said plant material,
   separating mashed arabinoxylan-containing plant material into a water-insoluble fraction and a water-solubilized fraction comprising solubilized (arabino)xylan-oligosaccharides;
   purifying by ion exchange chromatography said water-solubilized fraction over a strong acid cation exchange resin and subsequently over a weak base anion exchange resin,
   wherein said purification reduces a nitrogen content;
   producing an (arabino)xylan-oligosaccharide preparation comprising:
   (arabino)xylan-oligosaccharides consisting of: a mixture of xylo-oligosaccharide and arabinoxylo-oligosaccharide molecules,
   wherein said (arabino)xylan-oligosaccharide molecules represent at least 50% (w/w) on total dry weight of said preparation, have an average degree of polymerization between 4 and 10 and an average degree of arabinose substitution between 0.15 and 0.35, and
   wherein the nitrogen content of said preparation is 0.16% (w/w) or less on total dry weight of said preparation.

24. A process for using an (arabino)xylan-oligosaccharide preparation comprising:
   (arabino)xylan-oligosaccharides consisting of:
   a mixture of xylo-oligosaccharide and arabinoxylo-oligosaccharide molecules,
   wherein said (arabino)xylan-oligosaccharide molecules represent at least 50% (w/w) of the total dry weight of said preparation, have an average degree of polymerization between 4 and 10 and an average degree of arabinose substitution between 0.15 and 0.35, and
   wherein the nitrogen content of said preparation is 0.16% (w/w) or less on total dry weight of said preparation; and
   the (arabino)xylan-oligosaccharide preparation is an ingredient in the production of a food or beverage product comprising between 0.25 g and 10 g of (arabino)xylan-oligosaccharide per serving of said food or beverage product.

25. A process for using an (arabino)xylan-oligosaccharide preparation obtainable by a method, said method comprising:
   mashing of arabinoxylan-containing plant material in water;
   treating the mashed arabinoxylan-containing plant material with an appropriate concentration of an endoxylanase in order to enzymatically depolymerise a fraction of the arabinoxylans comprised in said plant material;
   separating mashed arabinoxylan-containing plant material into a water-insoluble fraction and a water-solubilized fraction comprising solubilized (arabino)xylan-oligosaccharides
   purifying by ion exchange chromatography said water-solubilized fraction over a strong acid cation exchange resin and subsequently over a weak base anion exchange resin,
   wherein said purification reduces a nitrogen content;
   producing an (arabino)xylan-oligosaccharide preparation comprising:
   (arabino)xylan-oligosaccharides consisting of:
   a mixture of xylo-oligosaccharide and arabinoxylo-oligosaccharide molecules,
   wherein said (arabino)xylan-oligosaccharide molecules represent at least 50% (w/w) on total dry weight of said preparation, have an average degree of polymerization between 4 and 10 and an average degree of arabinose substitution between 0.15 and 0.35, and
   wherein the nitrogen content of said preparation is 0.16% (w/w) or less on total dry weight of said preparation, and
   the (arabino)xylan-oligosaccharide preparation is as an ingredient in the production of a food or beverage product comprising between 0.25 g and 10 g of (arabino)xylan-oligosaccharide per serving of said food or beverage product.

* * * * *

UNITED STATES PATENT AND TRADEMARK OFFICE
CERTIFICATE OF CORRECTION

PATENT NO. : 8,927,038 B2  
APPLICATION NO. : 12/934224  
DATED : January 6, 2015  
INVENTOR(S) : Willem Broekaert et al.

Page 1 of 1

It is certified that error appears in the above-identified patent and that said Letters Patent is hereby corrected as shown below:

In the Claims,

Column 31, Claim 8, Line 53, replace "varing" with --varying--.

Column 32, Claim 17, Line 45, replace "oliqosaccharide" with --oligosaccharide--.

Signed and Sealed this  
Twenty-sixth Day of May, 2015

Michelle K. Lee  
*Director of the United States Patent and Trademark Office*